United States Patent [19]

Suzuki

[11] Patent Number: 5,654,812
[45] Date of Patent: Aug. 5, 1997

[54] LIGHT-RECEIVING DEVICE, OPTOELECTRONIC TRANSMISSION APPARATUS, AND OPTICAL DEMULTIPLEXING METHOD

[75] Inventor: Nobuo Suzuki, Tokyo, Japan

[73] Assignee: Kabushiki Kaisha Toshiba, Kawasaki, Japan

[21] Appl. No.: 526,102

[22] Filed: Sep. 11, 1995

[30] Foreign Application Priority Data

Sep. 17, 1994 [JP] Japan .................... 6-248891

[51] Int. Cl.⁶ ...................................... H04J 14/08
[52] U.S. Cl. .......................... 359/139; 359/117
[58] Field of Search ..................... 359/117, 123, 359/128, 138, 139, 120, 132, 121

[56] References Cited

U.S. PATENT DOCUMENTS

| | | | |
|---|---|---|---|
| 5,289,302 | 2/1994 | Eda | 359/123 |
| 5,369,515 | 11/1994 | Majima | 359/125 |
| 5,457,556 | 10/1995 | Shiragaki | 359/139 |

FOREIGN PATENT DOCUMENTS

PCT00787 6/1992 WIPO ................. G02B 6/26

OTHER PUBLICATIONS

New Applications of a Sinusoidally Driven Ingaasp Electroabsorption Modulator to In-Line Optical Gates with ASE Noise Reduction Effect, Journal of Lightwave Technology, vol. 10, No. 12, Dec. 1992, Masatoshi Suzuki et al., pp. 1912–1918.

Ho et al, Wavelength–Reusable and Topology–Reconfigurable WDM Optical Networks for High–Speed Multicomputer and Lan Networks, Poster Exhibit of Supercomputing '93 Conference pp. 1–7.

Ho et al, Monolithic Optical Equalizer Array for Wavelength–Reusable and Topology–Reconfigurable WDM Local Area Networks, IEEE LEOS '93 Nov. 1993 pp. 416–417.

Ho et al, LDOT, Department of Electrical and Computer Engineering, University of Illinois at Urbana–Champaign, Supercomputing '93.

*Primary Examiner*—Wellington Chin
*Assistant Examiner*—Rafael Bacares
*Attorney, Agent, or Firm*—Oblon, Spivak, McClelland, Maier & Neustadt, P.C.

[57] ABSTRACT

A light-receiving device including an optical waveguide for propagating a time-series signal light pulse string, a plurality of optical gates arranged in series along the optical waveguide and capable of switching between a transparent mode and a light-receiving mode in accordance with the presence/absence of a trigger light pulse, a mode switching unit for switching each of the optical gates from the transparent mode to the light-receiving mode by sending the trigger light pulse to each of the optical gates such that each of the optical gates can receive a predetermined slot included in the signal light pulse string, and a read circuit for reading the slots received by the plurality of optical gates as parallel electrical signals. The light-receiving device allows for efficient optoelectronic demultiplexing as compared to optical demultiplexing using optical time-division multiplexing (TDM) while achieving a compact, lightweight, and stable arrangement and a low dependency on polarization.

14 Claims, 16 Drawing Sheets

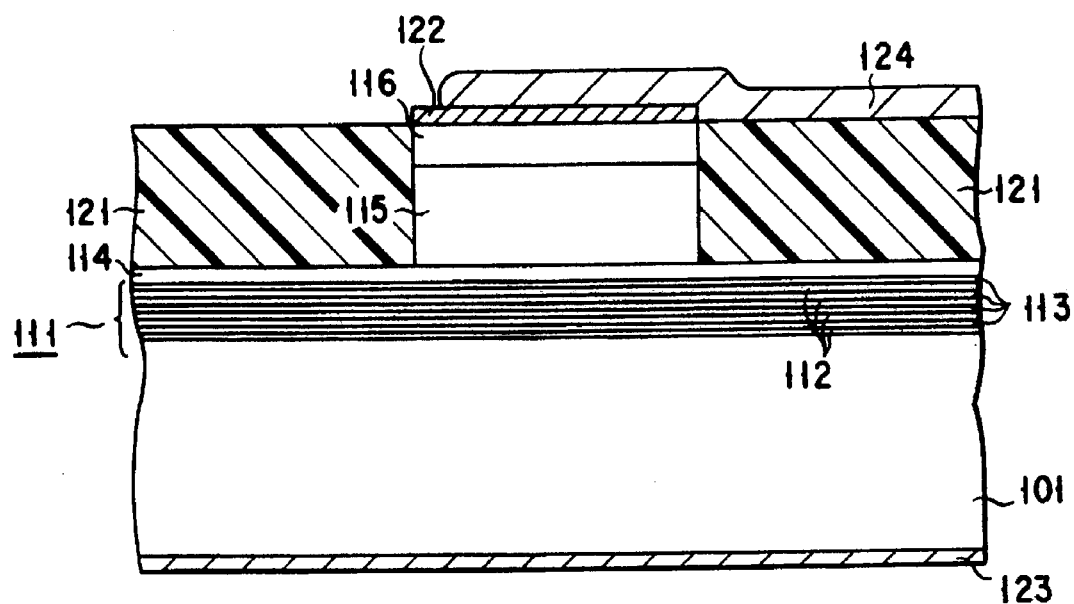
F I G. 15
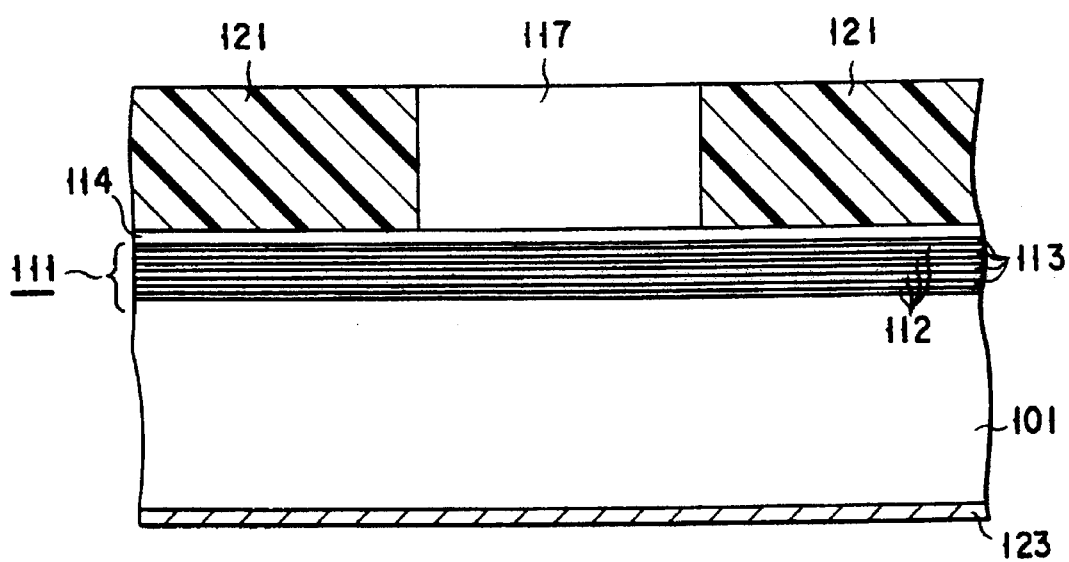
F I G. 16

LIGHT-RECEIVING DEVICE, OPTOELECTRONIC TRANSMISSION APPARATUS, AND OPTICAL DEMULTIPLEXING METHOD

BACKGROUND OF THE INVENTION

1. Field of the Invention

The present invention relates to an optical transmission technique and, more particularly, to a light-receiving device for converting a signal light pulse string which is multiplexed by optical time-division multiplexing (optical TDM) into an electrical signal, an optical transmission apparatus using the same, and an optoelectronic demultiplexing method.

2. Description of the Related Art

The recent development of technologies related to optoelectronics, including a semiconductor laser, a low-loss optical fiber, an optical fiber amplifier, and a high-speed integrated circuit, allows long-distance transmission of a large amount of information at a data rate of 10 Gb/s. In a coming multimedia age, however, general end users would also utilize a large amount of information such as high-definition video information in real time. Therefore, an infrastructure allowing transmission of a larger amount of information must be established.

In spite of the development of high-speed integrated circuit technologies, electronic devices for processing information at a rate of several tens Gb/s or more have problems of wiring delay, power consumption, and high manufacturing/mounting costs. As a means for transmitting information in a large amount not to allow one-time electronic processing through an optical fiber, optical time-division multiplexing (optical TDM) becomes important as well as optical frequency multiplexing (optical FDM).

Optical TDM transmission is a technique in which a plurality of modulated short light pulse signals are optically multiplexed on the time axis, transmitted, and optically demultiplexed and received on the receiver side. To realize this technique, the short light pulse generation technique, the optical multiplexing technique, the optoelectronic demultiplexing technique, the optical synchronization technique, and the like must be established.

As for the short light pulse generation technique, a stable operation has already been obtained by a means such as gain switching of a semiconductor laser, a mode-locked semiconductor laser, or a soliton light source combining a semiconductor laser with a semiconductor optical modulator. Multiplexing can also be relatively easily realized using a photocoupler for multiplexing light pulse strings while synchronizing each light pulse string with predetermined time slots. To the contrary, a conventional optical demultiplexer has a complex arrangement, which is far from a practical system because of its size, efficiency, cost, and stability.

Various optical demultiplexers for optical TDM have been proposed so far, and they can be roughly classified as follows.

(1) Demultiplexers using nonlinearity (Kerr effect) of an optical fiber.

(2) Demultiplexers using four-wave mixing in a semiconductor laser amplifier.

(3) Demultiplexers which select a specific slot from a passively branched pulse string through a gate.

Typical examples will be briefly described below. As example (1), i.e., a switch using nonlinearity of an optoelectronic fiber, optical demultiplexing using a nonlinear optic loop mirror (NOLM) is known. 1:16 optoelectronic demultiplexing is realized by the NOLM (P. A. Andrekson et al., IEEE Photon. Technol. Lett., Vol. 4, p. 644, 1992).

From the viewpoint of practical use, however, this technique has the following problems. The NOLM has the same arrangement as that of a Sagnac interferometer serving as a high-sensitivity accelerometer. For this reason, the NOLM tends to be influenced by external acoustic vibrations and need countermeasures for the setting environment. In addition, to realize N:N optoelectronic demultiplexing, multiple connection of NOLMs is required. However, since one of the outputs of the photocoupler is identical to an input to the incident port, an optical circulator or the like is necessary, resulting in a complex and bulky arrangement. When a plurality of NOLMs are to be connected, a large number of control pulse sources with a large peak power must be prepared, and their synchronization is also difficult.

As optoelectronic demultiplexing techniques using nonlinearity of an optical fiber, various techniques have been proposed, including an optical Kerr shutter and a method in which cross phase modulation is used to apply frequency shifts in a pulse string and demultiplexing is performed by a diffraction grating. In any case, however, as in the above example, the arrangement becomes complex or tends to be influenced by external disturbance, control light with a large power is necessary, and countermeasures against polarization variation of signal light are necessary. Therefore, it is difficult to realize a compact, low-cost and stable optical demultiplexer.

As example (2) using four wave mixing in a semiconductor laser amplifier, an optical demultiplexer using a polarization insensitive traveling wave type semiconductor laser amplifier in a gain saturation state is known (R. Ludwing and G. Raybon, European Conf. on Optical Comm., 1993, Montreux, Switzerland, ThP 12.2).

This arrangement is simpler than the above optical multiplexer using a NOLM, and the stability is also improved. However, to realize an N:N optical demultiplexer, multiple connection through a narrow-band filter (or optical wavelength demultiplexer) for separating signal light from control light is necessary. In addition, power consumption for control light generation or optoelectronic amplification is large, resulting in a degradation in efficiency. Furthermore, synchronization is difficult. Therefore, in this method as well, it is difficult to realize a compact, low-cost, and stable optoelectronic demultiplexer.

As example (3) using an optical gate switch, an optical demultiplexer using a semiconductor electroabsorption (EA) optical modulator is known (M. Suzuki et al., J. Lightwave Technol., Vol. 10, p. 1912, 1992).

According to this method, the arrangement is simple, and the dependency on polarization is low. However, there are the following problems. First, all light signals are uniformly distributed to N branches through a passive optical coupler. For this reason, the optical power at each branch becomes 1/N. Since light signals except for that corresponding to a predetermined time slot are absorbed in the optical gate, power utilization efficiency is low. Second, to reduce the duty ratio of the optical gate, a high bias voltage and a large sine wave amplitude are necessary, resulting in an increase in power consumption or size of the power supply/driving system of the EA modulator. Third, a large sine wave applied to the EA modulator may influence a low-level signal after reception, so that appropriate electrical isolation must be ensured. Additionally, synchronization between a light signal and an electrical signal must be adjusted branch by branch.

As other techniques included in category (3), there are a method of realizing high-speed optical demultiplexing by a Mach-Zehnder optical modulator (e.g., M. Jinno, IEEE Photon. Technol. Lett., Vol. 4, p. 641, 1992), a method of performing optical demultiplexing by an optical trigger gate (e.g., T. Kamiya et al., CLEO'87 Technical Digest 6, 1987), and the like. Any of them also has similar problems of energy utilization efficiency, gate driving power, and the like. Therefore, in the method (3) as well, it is difficult to realize a compact, low-cost, and efficient optical demultiplexer.

As described above, the conventional optical demultiplexers of an optical TDM system has the following problems, i.e., a complex and bulky arrangement, the requirement of countermeasures against polarization variation of signal light, poor signal light utilization efficiency, large power consumption of a driving signal or control light, and cost and stability, so it cannot be put in practical use.

SUMMARY OF THE INVENTION

It is an object of the present invention to provide a compact and low-cost light-receiving device capable of realizing a stable and efficient optoelectronic demultiplexing function.

It is another object of the present invention to provide an optical TDM transmission apparatus using a light-receiving device having the above function.

According to the first aspect of the present invention, there is provided a light-receiving device comprising optical waveguide means for propagating a signal light pulse string, an optical gate inserted to a predetermined position of the optical waveguide means and capable of switching a transparent mode and a light-receiving mode in accordance with the presence/absence of a trigger light pulse, mode switching means for switching the optical gate from the transparent mode to the light-receiving mode by sending the trigger light pulse to the optical gate such that the optical gate can receive a predetermined slot included in the signal light pulse string, and means for reading the slot received by the optical gate as an electrical signal.

Preferred embodiments of the present invention are as follows.

(1) A plurality of optical gates are arranged. When one trigger light pulse generated in synchronism with a signal light pulse switches each optical gate from the transparent mode to the light-receiving mode at a predetermined time, the pulse pattern of the time-series signal light pulse string propagating through the optical waveguide means is read as a parallel electrical signal.

(2) The optical gate is switched between the transparent mode and the light-receiving mode by using the Stark shift of the absorption edge wavelength by an applied field, i.e., the electroabsorption effect.

The following (2a) to (2d) are more preferable embodiments of the embodiment (2).

(2a) The mode switching means is an photoconductive switch electrically connected to the optical gate. When the photoconductive switch is switched from a high-resistance state to a low-resistance state by a trigger light pulse, a voltage to be applied to the optical gate is changed to switch the mode of the optical gate.

(2b) Second optical waveguide means is formed almost parallel to the optical waveguide means (to be referred to as first optical waveguide means hereinafter). Photoconductive switches corresponding to the optical gates are inserted in the second optical waveguide and arranged at an interval almost equal to that between the optical gates. The trigger light pulse is input to the second optical waveguide in a direction opposite to that of the signal light pulse string in synchronism with a light signal propagating through the first optical waveguide.

(2c) A semiconductor photodetector for detecting a synchronous signal is arranged at the end of the optical waveguide means.

(2d) The light-receiving device is constituted by a plurality of unit semiconductor light-receiving devices characterized by embodiment (2) and high-speed optical switch(es). A light pulse signal group to be received by each unit semiconductor light-receiving device is distributed by the optical switch.

(3) The optical gate is in the transparent mode with respect to a signal light pulse in the absence of a trigger light pulse. When a trigger light pulse is incident, the band edge wavelength is changed by the optical Stark effect to switch the optical gate to the light-receiving mode for absorbing the signal light pulse.

The following (3a) to (3h) are more preferable embodiments of embodiment (3).

(3a) The optical gate has a quantum well structure, and the trigger light pulse has a wavelength corresponding to the intersubband transition energy of the quantum well.

(3b) The optical gate has a quantum well structure having bias voltage application means. A bias voltage is applied to the optical gate such that the optical gate is in the transparent mode with respect to a signal light pulse in the absence of a trigger light pulse, and changed to the light-receiving mode when the optical Stark effect is caused by a trigger light pulse. This is realized by constituting the optical gate by a diode structure in which an intrinsic (to be referred to as an i type hereinafter, though it may be of an n or p type at a low carrier concentration) quantum well structure is sandwiched between a p-type cladding layer and an n-type cladding layer, and applying a reverse bias to this diode structure.

(3c) The trigger light pulse sequentially switches the optical gates from the transparent mode to the light-receiving mode while propagating through the optical waveguide means in a direction opposite to the signal light pulse string.

(3d) The optical waveguide means has the same quantum well structure as that of the optical gate. A portion except for the optical gate is formed such that an external field is hardly applied.

(3e) Means for increasing the speed for extracting carriers from the quantum well is formed. As for the response speed of the optical gate, design must be made in consideration of the carrier traveling time of the optical gate, the capacitance of the optical gate, the external circuit arrangement, and the like, as a matter of course.

(3f) The trigger light pulse has a width and intensity capable of maintaining the optical gate in the light-receiving mode throughout the time width for passing a corresponding signal light pulse through each optical gate.

(3g) The trigger light pulse propagates through the optical waveguide in the TM mode.

(3h) The power of the signal light pulse string is suppressed not to cause a conspicuous optical Stark effect.

(4) The dependency of photosensitivity of the optical gate on polarization with respect to a signal light pulse string is low. The optical waveguide also preferably has no dependency of the propagation loss or external coupling efficiency on polarization.

(5) An external circuit connected to the optical gate has appropriate threshold characteristics.

(6) Most or all constituent elements are integrated on a semiconductor substrate. Particularly, the optical gates and the optical waveguide means are integrated on a single substrate.

(7) The optical gates are formed on different substrates arranged at a predetermined optical path interval. The signal light pulse propagates to cross the substrates.

According to the second aspect of the present invention, there is provided an optical transmission apparatus in which a plurality of nodes are connected to each other through an optical fiber, each of said plurality of nodes comprising means for transmitting a series of time-series light pulse signal groups onto said optical fiber while selecting a timing not to overlap another light signal pulse group transmitted through said optical fiber, reception means for selecting and receiving only a light pulse signal group to be received by said node from the series of light pulse signal groups transmitted through said optical fiber, and relay means for relaying a light pulse signal group which is to be received by another node to a next node without converting the light pulse signal group into an electrical signal, wherein said reception means has a plurality of semiconductor electro-absorption type optical gates inserted along an optical waveguide at a predetermined interval and capable of switching between a transparent mode and a light-receiving mode in accordance with an applied voltage, a plurality of optical semiconductor trigger switches for changing a voltage to be applied to said plurality of optical gates to sequentially switch said optical gates from the transparent mode to the light-receiving mode, and means for reading the light pulse signal group absorbed by said plurality of optical gates as parallel electrical signals.

Preferred embodiments of the present invention are as follows.

(1) Routing control light is multiplexed with a light pulse signal group and transmitted between the nodes. Each node has a function of receiving all the transmitted routing control light, a function of performing routing of the light pulse signal group in units of light pulse signal groups in accordance with the control signal, and a function of transmitting routing control light associated with all light pulse signal groups to the next node.

(2) The node-to-node distance with respect to the light pulse signal group, i.e., the optical path between the first optical router of a given node and the last optical router of an adjacent node is larger than the node-to-node distance with respect to routing control light, i.e., the optical path between the routing control light receiver of the given node and the routing control light transmitter of the adjacent node. At least part of the optical path difference may be realized by an optical fiber amplifier or a dispersion compensating fiber.

(3) Light pulse signal groups are not continuously transmitted to a specific reception node.

According to the third aspect of the present invention, there is provided an optical transmission apparatus in which a plurality of nodes are connected to each other through an optical fiber, each of said plurality of nodes comprising means for transmitting a series of time-series light pulse signal groups onto said optical fiber while selecting a timing not to overlap another light signal pulse group transmitted through said optical fiber, and reception/relay means for selecting and receiving only a light pulse signal group to be received by said node from the series of light pulse signal groups transmitted through said optical fiber and relaying a light pulse signal group which is to be received by another node to a next node without converting said light pulse signal group into an electrical signal, wherein said reception/ relay means has a plurality of optical Stark gates inserted along an optical waveguide at a predetermined interval and capable of switching between a transparent mode and a light-receiving mode in accordance with the presence/ absence of a trigger light pulse, and means for reading the light pulse signal groups absorbed by said plurality of optical Stark gates as parallel electrical signals.

In the invention of the third aspect as well, the same routing control as in embodiment (1) or (2) of the invention of the second aspect is preferably performed.

According to the fourth aspect of the present invention, there is provided an optical transmission apparatus in which a plurality of nodes are connected to each other through an optical fiber, each of said plurality of nodes comprising means for performing time-division multiplexing of a light pulse signal consisting of an assigned periodic slot with a signal light pulse transmitted from another node and transmitting the light pulse signal to said optical fiber, a trigger light pulse source for generating a periodic trigger light pulse in synchronism with a target reception slot on said optical fiber, an optical gate which is switched to a light-receiving mode only when the trigger light pulse exists and otherwise set in a transparent mode, and means for reading the slot received by said optical gate switched to the light-receiving mode as an electrical signal.

In this case as well, an appropriate node control signal is preferably multiplexed.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 15 is a sectional view schematically showing the sectional structure of the optical gate of the light-receiving device shown in FIG. 14;

FIG. 16 is a sectional view schematically showing the sectional structure of the optical waveguide of the light-receiving device shown in FIG. 14;

DETAILED DESCRIPTION OF THE PREFERRED EMBODIMENTS

Prior to a description of embodiments of the present invention, the basic arrangement of a light-receiving device according to the present invention will be described.

Figure 1:
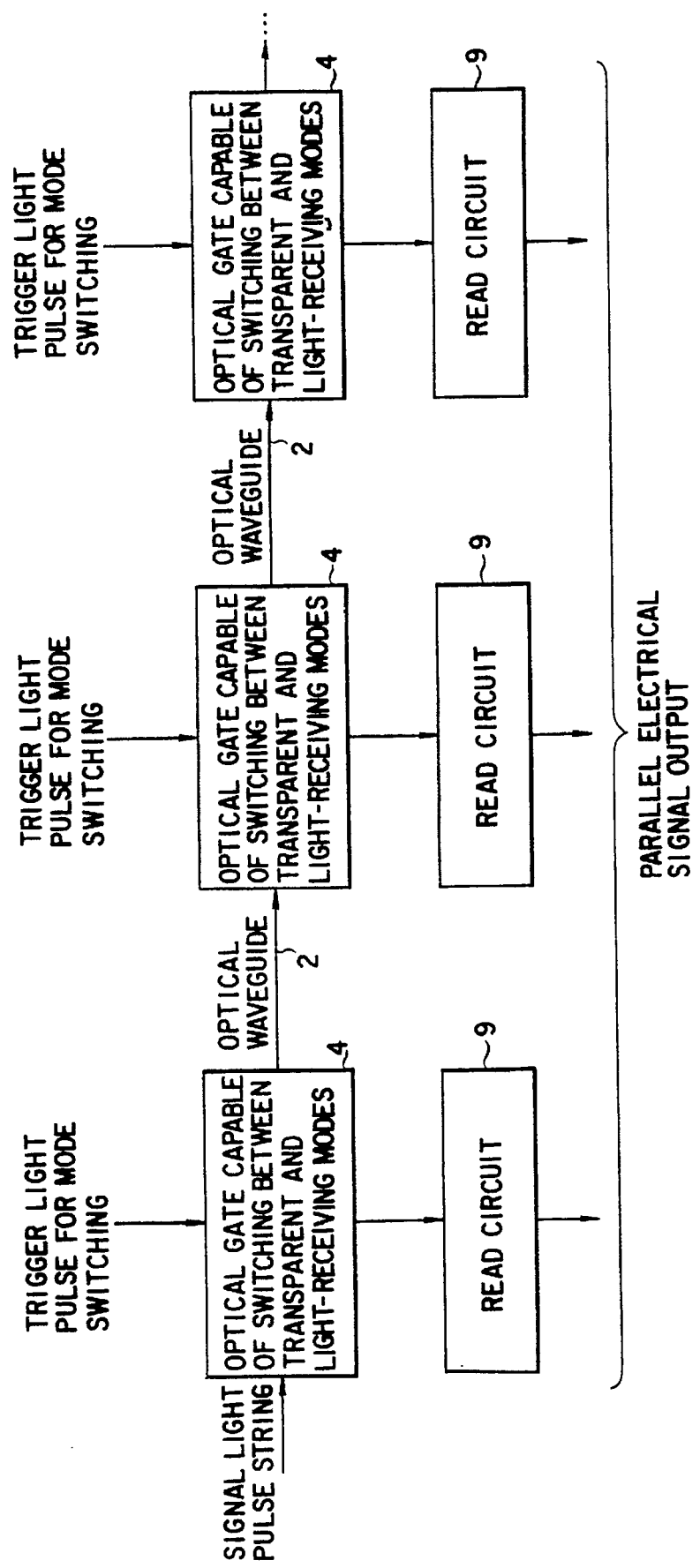
FIG. 1 is a block diagram showing the basic arrangement of a light-receiving device according to the present invention.

FIG. 1 is a block diagram showing the light-receiving device according to the present invention.

In the light-receiving device of the present invention, the demultiplexing operation of the optical TDM transmission system is performed neither in a pure optical region nor in a pure electric region, but in a light-receiving element array serving as a photoelectric conversion unit. Particularly, this device is characterized in that a time, i.e., spatial pulse pattern traveling through an optical waveguide 2 is parallelly read using a plurality of optical gates 4 capable of switching between a transparent mode and an absorption/light-receiving mode.

In this sense, the light-receiving device of the present invention can be considered as an optical demultiplexer of a new type. The optical gate 4 is switched from the transparent mode to the absorption/light-receiving mode in accordance with a trigger light pulse for mode switching. When the incidence timing of a synchronous light pulse is appropriately set, each optical gate can be switched to the absorption/light-receiving mode immediately before incidence of the corresponding predetermined light signal slot.

A read circuit 9 outputs an output signal of a specific slot received by the optical gate 4 as an electrical signal in a form suitable for the subsequent processing. More specifically, parallel electrical signals are output, thereby realizing the demultiplexing operation. These parallel electrical signals may be converted into a serial signal at a lower rate than that of the original light signal and read.

The operation of the above light-receiving device will be described below.

A signal light pulse string is supplied to the optical gates 4 through the optical waveguide 2. Each optical gate 4 is in the transparent mode first, and switched to the light-receiving mode upon incidence of a trigger light pulse. If a signal light pulse is present, the optical gate 4 switched to the light-receiving mode absorbs the light and generates an electrical signal. As a result, each optical gate can electrically detect the presence/absence of a signal light pulse at an arbitrary time slot synchronized with a trigger light pulse.

If N optical gates are inserted in the optical waveguide 2, and a trigger light pulse is incident in synchronism with a signal light pulse at the time slot of each optical gate, a time-series signal light pulse string consisting of N time slots can be read by the N optical gates as parallel electrical signals. That is, 1:N demultiplexing of the time-series optical TDM signal on the optical waveguide 2 is performed. At this time, the signal rate of the output electrical signal of one channel is 1/N that of the original light signal. As a matter of course, some of the N slots may be used as control slots or redundancy slots. In this case, the signal rate of the output electrical signal of one channel becomes lower than 1/N that of the original light signal.

Assume that a trigger light pulse is generated from one light source in synchronism with a predetermined signal of the signal light pulse string. In this case, when the optical path length from the light source to the mode switching section (not shown) of each optical gate is appropriately set, proper synchronization between the optical gates can be easily set. The trigger light pulse may be distributed to the mode switching section of each optical gate, or one trigger light pulse may travel to sequentially switch the mode of each optical gate.

The first method of switching between the transparent and light-receiving modes of the optical gate 4 uses the Stark shift of the band edge wavelength by an applied field, i.e., the electroabsorption effect.

When the electroabsorption effect is used for the optical gate 4, the absorption coefficient of the optical gate (electroabsorption region) with respect to a light pulse signal largely changes in accordance with the magnitude of an applied voltage. An optical trigger switch (not shown) included in the mode switching section changes the voltage to be applied to the semiconductor electroabsorption region at a high speed, thereby switching the semiconductor electroabsorption region to the transparent mode or the light-receiving mode with a large absorption coefficient. Therefore, when the arrangement and the switching timing of the mode switching section (optical trigger switch) are adjusted to be synchronized with a light pulse at a slot for each semiconductor electroabsorption region, a photocurrent flows through each semiconductor electroabsorption region in accordance with the presence/absence of the light pulse at the corresponding slot. Demultiplexing of an optical TDM signal is performed by parallelly reading electrical signals generated in the above manner.

As a means for switching the voltage to be applied to the optical gate 4 (optical trigger switch), an photoconductive switch electrically connected to the optical gate can be used. When a trigger light pulse is incident on the photoconductive switch, the resistance of the photoconductive switch is abruptly decreased by carriers generated upon light absorption, thereby changing the voltage to be applied to the electrically connected optical gate 4.

To receive only a light pulse at a specific slot, the time required to switch the semiconductor electroabsorption region from the transparent mode to the light-receiving mode must be shorter than the period of the signal light pulse string. However, the switching time from the light-receiving mode to the transparent mode need not always be shorter than the period of the signal light pulse string. This is because a semiconductor electroabsorption region which is switched to the light-receiving mode to detect a certain light pulse cannot receive the subsequent light pulses, because the subsequent light pulses are absorbed in the remaining semiconductor electroabsorption regions.

The electroabsorption effect itself has a very high speed. However, the time required to switch the voltage to be applied to the electroabsorption region is limited by the charge/discharge time of the electroabsorption region. The capacitance of a electroabsorption region can be set to almost 0.1 pF. However, if a bonding wire or a 50-Ω terminating resistor is present, the LC or RC time constant becomes large, so a high-speed response cannot be realized. When voltage sources (not shown) and optical trigger switches are arranged close between the semiconductor electroabsorption regions, the voltage to be applied to the semiconductor electroabsorption region can be rapidly changed by pulsed trigger light, and the transparent mode can be switched to the light-receiving mode.

If all the semiconductor electroabsorption regions are simultaneously switched to the light-receiving mode, a light pulse pattern on the optical waveguide at that point of time is read. However, the semiconductor electroabsorption regions need not always be simultaneously switched and may be sequentially switched with a predetermined delay time. In this case, the delay time interval for switching each semiconductor electroabsorption region can be properly set by branching or sequentially using a single pulse generated from a single pulse source.

More specifically, a trigger light pulse synchronized with a signal light pulse string is caused to propagate through a second optical waveguide (not shown) arranged almost parallel to the optical waveguide 2 (first optical waveguide) from a direction opposite to the signal light. When the optical trigger switches are sequentially turned on in accordance with the trigger light pulse, the above function can be realized. In this case, the arrangement period of the semiconductor electroabsorption regions can be half that required to simultaneously turn on all the semiconductor electroabsorption regions, so that the total length of the element can be decreased.

In the light-receiving device of the present invention, a trigger light pulse must be properly synchronized with a signal light pulse string. If a photodetector for detecting a synchronous signal is arranged at the distal end of the optical waveguide 2 (first optical waveguide), an output from the photodetector can be used to properly set the timing of the trigger light pulse.

The number of pulses receivable by the above light-receiving device is limited by the number of semiconductor electroabsorption regions arranged along the optical waveguide 2 (first optical waveguide). Actually, the scale of the light-receiving device is limited by restrictions such as the size, wave guide loss, dispersion, and attenuation of the trigger light pulse. If the time required to restore the semiconductor electroabsorption regions from the light-receiving mode to the transparent mode is short, a long pulse string can also be received by repeatedly using this light-receiving device. However, if this time is long, a continuously arriving long pulse string cannot be received. However, when a plurality of light-receiving devices are prepared and used while being switched by high-speed optical switches, this problem can be solved.

The second method of switching between the transparent and light-receiving modes of the optical gate 4 uses the optical Stark effect. More specifically, the band edge wavelength of a semiconductor is shifted by a strong trigger light pulse, thereby switching between the light-receiving mode and the transparent mode.

The optical gate 4 is constituted by an optical waveguide having a semiconductor quantum well structure. The exciton absorption wavelength of the quantum well structure is set to a slightly short wavelength side of the signal light wavelength in the absence of a trigger light pulse. The wavelength of the trigger light pulse is caused to be resonant with a wavelength corresponding to the intersubband transition energy of the quantum well, thereby realizing a large optical Stark shift.

While carriers are scarcely present in the quantum well, the ground state of intersubband absorption is vacant. Therefore, the optical gate does not absorb the trigger light pulse. However, if the trigger light is strong, resonance energy is split by coherent interaction between the electromagnetic field and the material (Rabi split) (e.g., P. J. Harshman et al., IEEE Journal of Quantum Electronics, vol. 30, no. 10, pp. 2297-2303, October 1994). When the field strength of a trigger light pulse is $E_t$, the dipole moment of intersubband transition is $\mu_t$, and the Planck's constant is h, the Rabi frequency $\Omega$ is given as $2\pi\mu_t E_t/h$. When the resonance energy in the absence of trigger light is $E_0$, the resonance energy with strong trigger light is split into $(E_0+h\Omega/(2\pi))$ and $(E_0-h\Omega/(2\pi))$. Therefore, when the band edge wavelength in the absence of trigger light is $\lambda_0$, the band edge wavelength with trigger light is represented as follows:

$$\lambda_0' = \lambda_0/\{1-(\Omega\,\lambda_0)/(2\pi c)\} \quad (1)$$

where c is the speed of light. As a result, when a strong trigger light pulse is present, the band edge wavelength is shifted to the long wavelength side (optical Stark effect), and the absorption coefficient of the signal light wavelength increases. For example, according to a reference (S. Noda et al., Fifth Optoelectronics Conference (OEC'94), Technical Digest, p. 92), this effect can be used for optical modulation. In the present invention, this effect is used for switching between the transparent and light-receiving modes of the optical gate 4.

Even though the wavelength corresponding to the intersubband transition energy does not completely match the trigger light wavelength, the optical Stark effect is obtained, although the shift amount is slightly deviated from the above value. Therefore, the intersubband transition wavelength and the trigger light wavelength need not always completely match each other as far as they are almost resonant with each other.

If each optical gate is to receive only a signal light pulse at a specific slot, the mode switching time of the optical gate must be shorter than the period of the signal light pulse string. Since the optical Stark effect is a very-high-speed phenomenon, each optical gate is almost instantaneously switched to the light-receiving mode upon incidence of a strong trigger light pulse, and almost instantaneously restored to the transparent mode when the trigger light pulse passes. Even if subsequent pulses cannot be completely absorbed in the preceding optical gates, no interference between pulses occurs as far as the optical gate is restored to the transparent mode until that time.

When an electric field is applied to the optical gate 4, the band edge wavelength is shifted to the long wavelength side by the quantum confined Stark effect (QCSE). For this reason, the signal light wavelength and the band edge wavelength can be finely adjusted. Additionally, when the quantum well layer is depleted by the electric field, intersubband absorption of the trigger light pulse can be prevented. Application of an electric field can also be effectively used to efficiently extract photocarriers at a high speed.

The entire optical waveguide 2 may have the same quantum well structure as that of the optical gate 4. At any other portion except for the optical gates 4, where no electric field is applied, the band edge wavelength is sufficiently short. For this reason, even when the optical Stark effect is caused by a trigger light pulse, the absorption coefficient can be maintained small with respect to a signal light pulse string. For example, when an upper cladding between the optical gates is formed of a semi-insulating semiconductor layer, the optical gates can be electrically insulated from each other. With this structure, the manufacturing process can be simplified, and the manufacturing cost and yield can be improved.

When the mask selective growth technique is used, the composition of a quantum well or thickness of a well can be changed place by place in epitaxial growth at one time. For this reason, the band edge wavelength or intersubband transition resonance wavelength between an optical gate and the remaining portions of the optical waveguide can be changed.

Even when the trigger light pulse passes, and the light-receiving mode is switched to the transparent mode, the light-receiving operation is not finished while carriers generated inside remain. In the light-receiving device of the present invention, if a subsequent series of signal light pulse strings are to be received immediately after receiving a series of signal light pulse strings (N time slots) corresponding to the number N of optical gates, the light-receiving operation must be completed during the light-receiving operation of the N time slots.

To extract carriers from the optical gate at a high speed, the carriers must be extracted by a sufficiently strong electric field, and additionally, it is preferable to provide a means for preventing the carriers from being piled up in a quantum well. Generally, it is known that, when an intermediate composition layer is inserted to make the barrier low or promote tunneling between wells, the residence time of carriers in a specific well or heterobarrier can be largely decreased.

As is well known, to decrease the capacitance, the optical gate length is preferably made shorter, and the depletion layer is preferably made thicker. To shorten the carrier traveling time, the depletion layer is preferably thin. The optical gate can decrease its length necessary for absorbing one signal light pulse by increasing the optical confinement factor (overlap of the quantum well layers and the propagation modes of signal light). The optimum structure design method considering these is basically the same as for a conventional waveguide type photodiode.

If the trigger light pulse has a sufficient width and intensity, the optical gate 4 can be maintained in the light-receiving mode throughout a time width while a signal light pulse passes through the optical gate 4. Upon generation of carriers in the light-receiving mode, intersubband absorption of the trigger light pulse occurs. For this reason, the trigger light pulse is slightly attenuated depending on the pattern of the signal light pulse. To realize a stable operation, a margin is necessary in consideration of this fact.

$\Gamma$ point intersubband transition of zinc blend type semiconductor which is generally used is allowed for only the TM mode. For this reason, when a trigger light pulse is caused to propagate through the optical waveguide in the TM mode, resonance with intersubband transition can be realized.

If a signal light pulse is not so strong, the signal light pulse itself does not influence mode switching of the Optical gate.

The polarized state of a signal light pulse string transmitted through an optical fiber often varies. If the optical gate has a low dependency of the photo sensitivity on polarization of the signal light pulse string, a stably electrical output can be obtained independently of the polarized state. For example, when tensile strained well layers are applied for the quantum well structure, the difference of photosensitivity between the TE mode and the TM mode can be decreased.

Even when the photocurrent output slightly varies because of variations in absorption coefficient, which are caused by the trigger light intensity, or the polarization state of signal light, the external electrical output level can be stabilized within a predetermined range as far as the external circuit connected to the optical gate has appropriate threshold characteristics.

When the above-described functions are integrated on a semiconductor substrate, the interval between the optical gates or their characteristics can be properly set with a high reproducibility, and a loss at optical connecting portions can be prevented. Additionally, stability and long-time reliability against temperatures and vibrations are also improved.

The optical gates may be formed on different substrates to cause a signal light pulse string to propagate in a direction crossing the substrates. In this case, when the distance between the substrates can be mechanically finely adjusted, fine adjustment of synchronization is also enabled.

With any one of the above-described structures, the light-receiving device of the present invention has an optoelectronic demultiplexing function for parallelly reading a light signal multiplexed by TDM. Therefore, demultiplexing of a light signal multiplexed by TDM can be performed with a simple, compact, efficient, stable, and low-cost device, unlike the conventional optical demultiplexer.

An optical transmission apparatus of the present invention constitutes a transparent optical network.

A high-speed router is arranged at each node of the optical transmission apparatus according to the above second aspect. The router branches only information to be received by a certain node to the light-receiving device in units of light pulse signal groups and relays other light pulse signal groups to the subsequent nodes without converting the light pulse signal to an electrical signal. The router also multiplexes the light pulse signal group to be transmitted from the node not to overlap the other light pulse signal groups in the optical fiber. The light-receiving device parallelly reads the transmitted light pulse signal group through a plurality of optical gates (semiconductor electroabsorption regions) arranged along the first optical waveguide.

When the semiconductor electroabsorption regions are sequentially switched from the transparent mode to the light-receiving mode by a trigger light pulse at a predetermined time interval, a time-series light pulse signal sent to the first optical waveguide can be parallelly extracted as electrical signals.

In the optical transmission apparatus of the present invention, control of switching between reception, transmission, and relay of light pulse signal groups is performed by the optical router routing information associated with all light pulse signal groups passing through this optical router is sent to the corresponding nodes in advance, each node can perform routing control without any error. The routing information can be transmitted while being multiplexed with a light pulse signal group at a specific wavelength.

If the node-to-node distance corresponding to the light pulse signal group is larger than that corresponding to routing control light, the corresponding routing control light reaches the routing control light-receiving device of the node before the light pulse signal group reaches the optical router. Therefore, the above function can be realized.

The light-receiving device used in the optical transmission apparatus of the present invention has characteristics representing that a time is required from reception of a light pulse signal group to reception of the next light pulse signal group. For this reason, unless a plurality of parallelly arranged light-receiving devices are time-divisionally switched, all light pulse signal groups which uninterruptedly arrive cannot be received. However, when the light pulse signal groups are multiplexed not to continuously arrive at a specific reception node, the time interval in repetitive use of a light-receiving device is increased. Therefore, all information can be received by a single light-receiving device.

An optical transmission apparatus according to the third aspect also has the similar function to that of the optical transmission apparatus according to the second aspect. However, according to the third aspect, a reception/transparent means is inserted in an optical fiber line constituting an optical network, so a high-speed optical router is not necessarily used. The reception/transparent means receives only information to be received by a certain node in units of light pulse signal groups and relays other light pulse signal groups to the subsequent nodes without converting the light pulse signal to an electrical signal. To multiplex the light pulse signal group to be transmitted from the node not to overlap the other light pulse signal groups in the optical fiber, either a high-speed router or a passive optical coupler may be used. The reception/transparent means parallelly reads the to-be-received light pulse signal group through a plurality of optical gates (optical Stark gates) arranged along the first optical waveguide.

The operation of the optical Stark gate has been described in the description associated with the function of the light-receiving device using the optical Stark effect. The optical Stark gate is normally in the transparent mode and switched to the light-receiving mode only when a trigger light pulse is present. For this reason, even if a subsequent pulse is incident while the light-receiving read operation of the received slot is continued, no interference between pulses is caused because the transparent mode is restored after the trigger light pulse passes. Therefore, unlike the optical transmission apparatus according to the second aspect, even when the reception/transparent means is inserted in the optical fiber line constituting the optical network, instead of branching by an optical router, propagation of a signal light pulse to be relayed to the next node is not impeded.

In an optical transmission apparatus according to the fourth aspect, a light signal is multiplexed by optical TDM not in units of signal light pulse groups but in units of bits. More specifically, within a certain time, one of N slots is assigned to transmission from a node A to a node B. The node A sends a signal light pulse to this slot. In the optical fiber, a light signal transmitted between other slots is multiplexed by optical TDM. The node B has a trigger light pulse source for generating a periodic trigger light pulse (one for the N signal slots) in synchronism with the target reception slot. The node B receives only the signal at the target reception slot by using an optical Stark gate which is switched to the light-receiving mode only when a trigger light pulse is present and normally in the transparent mode, and transmits other slots to the next node. The operations of the optical Stark gate and a means for reading an electrical signal are the same as those described above.

Embodiments to which the present invention is applied will be described below.

First Embodiment

Figure 2:
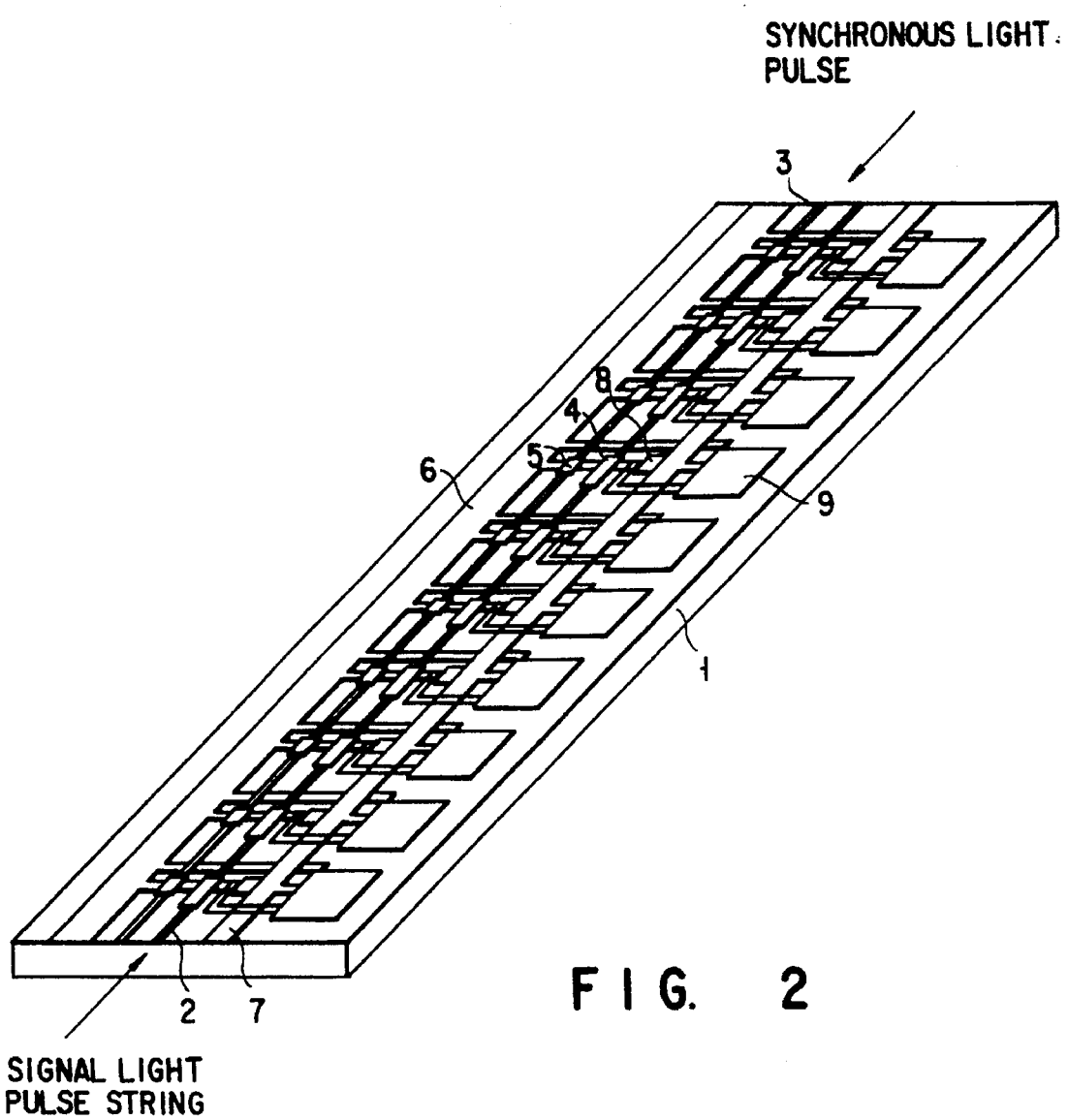
FIG. 2 is a perspective view schematically showing the arrangement of a light-receiving device according to the first embodiment of the present invention.

FIG. 2 is a perspective view schematically showing the arrangement of a light-receiving device according to the first embodiment of the present invention. This light-receiving device is constituted by a first optical waveguide 2 formed on a semi-insulating InP substrate 1, a second optical waveguide 3 formed close and parallel to the first optical waveguide 2, ten electroabsorption regions 4 formed along the first optical waveguide 2 at a period of about 0.5 mm and each consisting of a strained InGaAsP/InGaAsP quantum well with a length of 0.2 mm, ten photoconductive switches 5 formed along the second optical waveguide 3 to be electrically connected to the electroabsorption regions 4, a power supply line 6 electrically connected to the photoconductive switches 5, resistors 8 ($R_L$) formed between the electroabsorption regions 4 and a ground line 7, and electronic circuit portions 9 for outputting a predetermined electrical pulse upon detection of a change in voltage of a predetermined pattern, which has occurred in the resistors 8.

A signal light pulse string having a wavelength of 1.55 μm at a rate of 100 Gb/s RZ (return-to-zero) can be supplied from the optical fiber to the first optical waveguide 2. A synchronous light pulse can be supplied to the second optical waveguide 3 from a side opposite to the signal light pulse string. Both the optical waveguides 2 and 3 have antireflection coating films on the incident/exit end faces, and highly efficient coupling with the optical fiber through an aspherical lens is realized.

Figure 3:
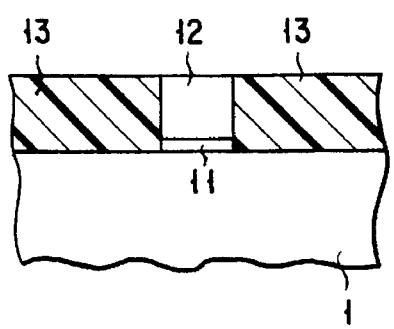
FIG. 3 is a sectional view schematically showing the sectional structure of the optical waveguide of the light-receiving device shown in FIG. 2.

FIG. 3 is a sectional view schematically showing the sectional structure of the first and second optical waveguides 2 and 3. This structure is constituted by an undoped lattice-matched InGaAsP light guide layer 11 formed into a mesa having a width of 2 μm on the semi-insulating InP substrate 1 and having a composition corresponding to a wavelength of 1.2 μm, a semi-insulating InP layer 12 formed on the light guide layer 11, and a polyimide layer 13 for burying the side surfaces of the mesa.

Figure 4:
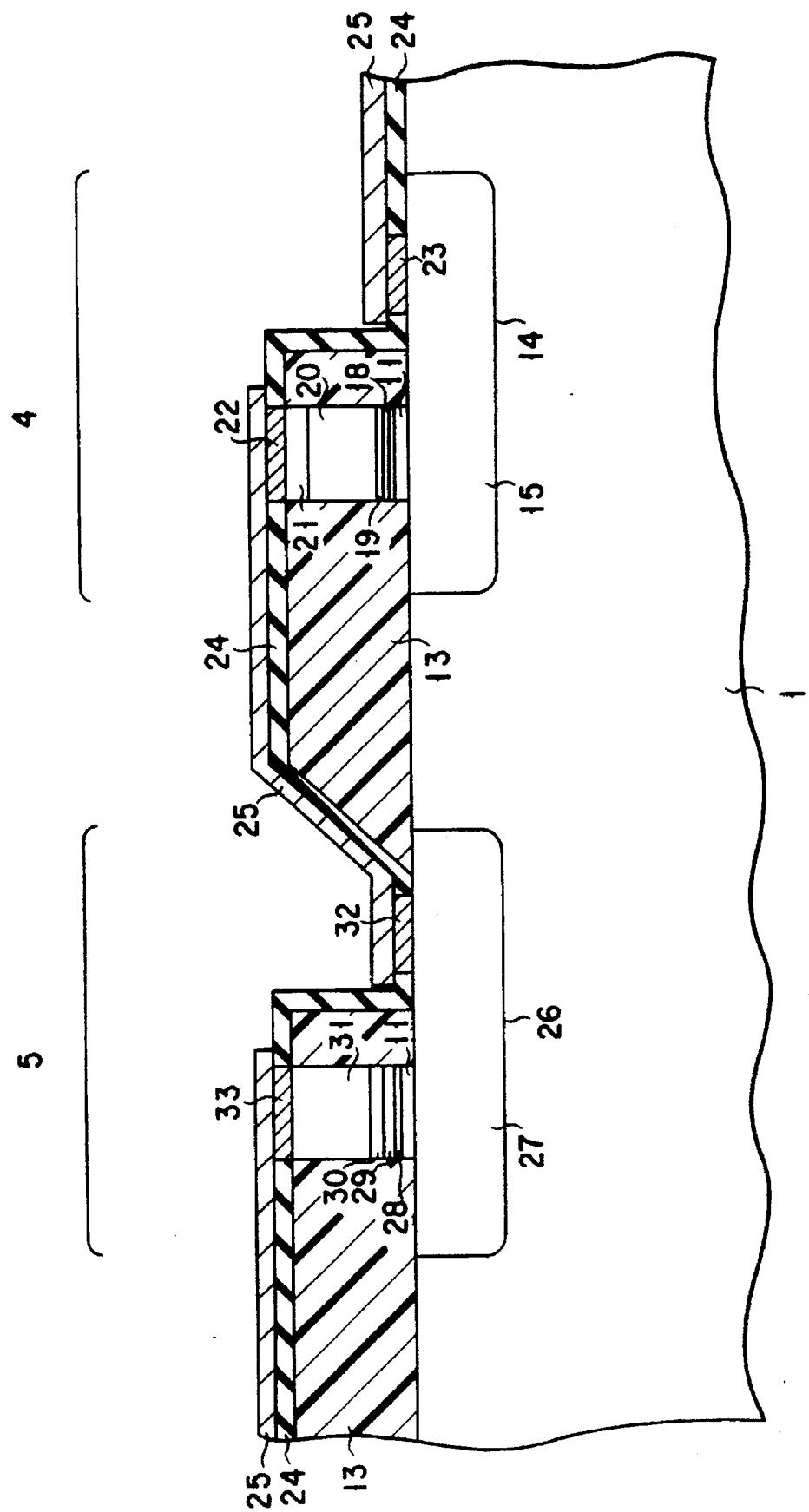
FIG. 4 is a sectional view schematically showing the sectional structure of the electroabsorption region and the photoconductive switch of the light-receiving device shown in FIG. 2.

FIG. 4 is a sectional view schematically showing the sectional structure of the electroabsorption region 4 and the photoconductive switch 5.

The electroabsorption region 4 has a multilayered structure constituted by an n-type InP cladding layer 15 formed in a groove 14 of the semi-insulating InP substrate 1 and having a thickness of 1 μm, a multiple quantum well layer 18 formed into a mesa on the cladding layer 15, an undoped lattice-matched InGaAsP guide layer 19 having a thickness of 0.03 μm, a p-type InP cladding layer 20, and a p-type InGaAsP ohmic contact layer 21. The multiple quantum well layer 18 is constituted by 12 undoped tensile strained InGaAsP well layers each having a thickness of 10 nm, and undoped lattice-matched InGaAsP layers each having a thickness of 6 nm and a composition corresponding to a wavelength of 1.2 μm and formed between the well layers.

The mesa width is 2 μm, and the side surfaces of the mesa are buried with the polyimide layer 13. An ohmic electrode 22 is formed on the surface of the p-type ohmic contact layer 21. An ohmic electrode 23 is formed on the n-type InP cladding layer 15 outside of the mesa portion. A surface portion without any electrode is covered with an insulating film 24. An electric wiring layer 25 is formed on the insulating film 24. Multilayered structures 11, 18, and 19 constitute part of the first optical waveguide 2.

The photoconductive switch 5 has a multilayered structure having an n-type InP layer 27 formed in a groove 26 of the semi-insulating InP substrate 1, the undoped lattice-matched InGaAsP guide layer 11 formed into a mesa on the InP layer 27 and having a thickness of 0.08 μm and a composition corresponding to a wavelength of 1.2 μm, an undoped lattice-matched InGaAs light absorption layer 28 having a thickness of 7 nm, an undoped lattice-matched InGaAsP light guide layer 29 having a thickness of 0.05 μm and a composition corresponding to a wavelength of 1.3 μm, a semi-insulating lattice-matched InGaAlAs layer 30, and an n-type InP layer 31.

The structure above the guide layer 11 is fabricated into a mesa having a width of 2 μm, and the side surfaces of the mesa are buried with the polyimide layer 13. An electrode 33 is formed on the n-type InP layer 31. An electrode 32 is formed on the n-type InP layer 27 outside of the mesa portion. A surface without any electrode is covered with the insulating film 24. Multilayered structures 11, 28, and 29 constitute part of the second optical waveguide 3.

Figure 5:
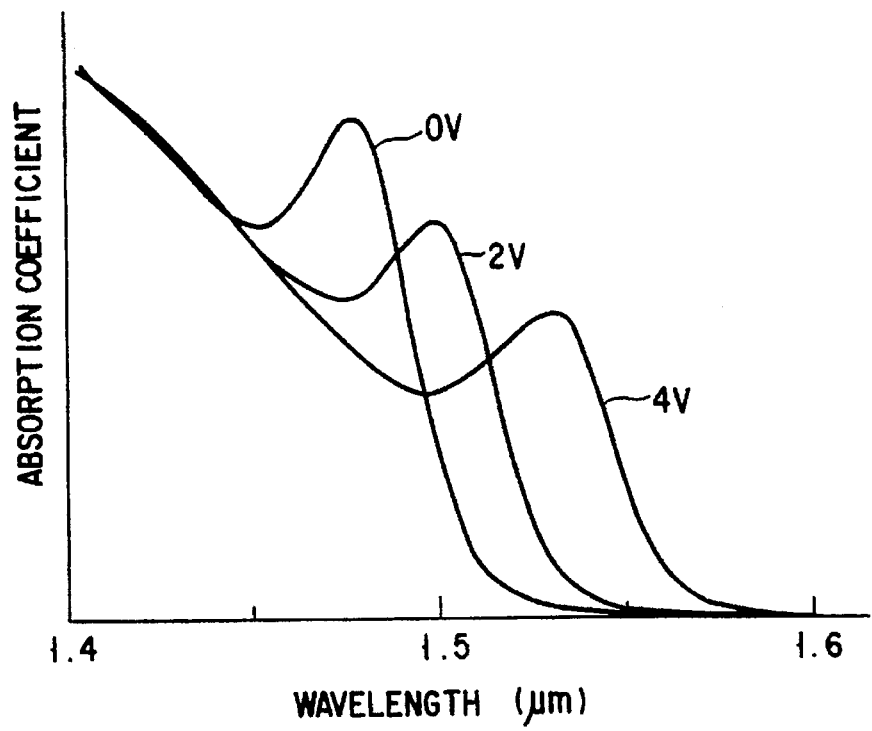
FIG. 5 is graph for explaining the absorption characteristics of the electroabsorption region of the light-receiving device shown in FIG. 2.

The absorption spectrum of the multiple quantum well layer 18 is changed by the QCSE (quantum confined Stark effect) in accordance with an applied voltage. FIG. 5 is a graph showing the absorption characteristics. The exciton absorption wavelength at an applied voltage of 0 V is about 1.48 μm. The exciton absorption wavelength at an applied voltage of 2 V is about 1.50 μm. The exciton absorption wavelength at an applied voltage of 4 V is about 1.53 μm. At a voltage of 2 V or less, signal light with a wavelength of 1.55 μm is scarcely absorbed. However, when the applied voltage is 4 V, almost all signal light propagating through the first optical waveguide 2 is absorbed.

Therefore, only when the applied voltage is high, and signal light is present, a photocurrent flows. Otherwise, no photocurrent flows. Since tensile strained quantum wells are used, the difference of absorption characteristics between the TE mode and the TM mode is small. A capacitance $C_{EA}$ of the electroabsorption region 4 is 0.3 pF or less.

At an applied voltage of 4 V, a high electric field of about 200 kV/cm is applied to the multiple quantum well layer 18. The composition of the InGaAsP guide layer 19 changes stepwise such that the bandgap increases on the p-cladding layer side. Therefore, holes generated upon light absorption in this high electric field are transported to the cladding layer 20 within 50 ps without being captured by a heterobarrier. Electrons have a mobility larger than that of the holes by about 10 times and transported to the cladding layer 15 in a shorter time.

Figure 6A:
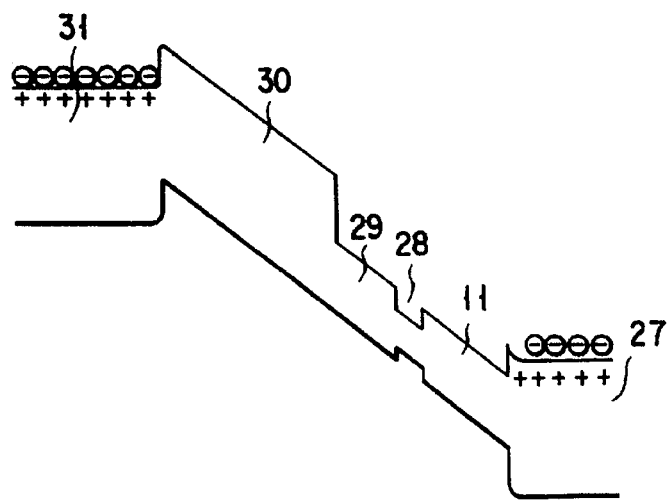
FIGS. 6A and 6B are views showing the band structure of the photoconductive switch of the light-receiving device shown in FIG. 2.
Figure 6B:
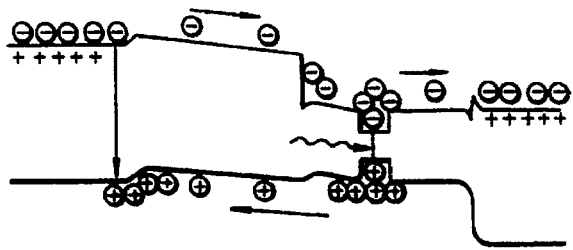

FIGS. 6A and 6B are views showing the band structure of the photoconductive switch 5. The valence band edge of the InGaAlAs layer 30 and that of the InGaAsP layer 29 are designed to almost match each other. The terminal voltage is assumed to be 3 V. While no synchronous light is incident on the second optical waveguide 3, the multilayered structures 11, 28, 29, and 30 are depletion regions in a high-resistance state (OFF state) of about 10 MΩ (FIG. 6A). An electrical capacitance $C_{PC}$ is 0.2 pF or less.

When a synchronous light pulse propagates through the second optical waveguide 3, the thin InGaAs layer 28 absorbs part of the light pulse to generate electron-hold pairs. Upon injection of the holes into the InGaAlAs layer 30, the potential with respect to the electrons residing in the n-type InP layer 31 is decreased. For this reason, the electrons are injected from the n-type InP layer 31 into the depletion layers 30, 29, 28, and 11. As a result, the photoconductive switch 5 is set in a low-resistance state (ON state) of several Ω. The terminal voltage is decreased, and an electron current flows (FIG. 6B).

The switching time to the ON state upon incidence of light is about 5 ps or less. The switching time to the OFF state upon extinction of light is limited by the lifetime of holes. When the carrier lifetime is decreased by, e.g., a method of doping the InGaAlAs layer 30 with an impurity for forming a deep level, the switching time can be shortened to about 50 ps.

The absorption layer 28 of the photoconductive switch 5 is thin and has a small optical confinement factor. For this reason, only part of the synchronous light pulse is absorbed, and the remaining propagates to the next photoconductive switch 5 through the second optical waveguide 3.

Figure 7:
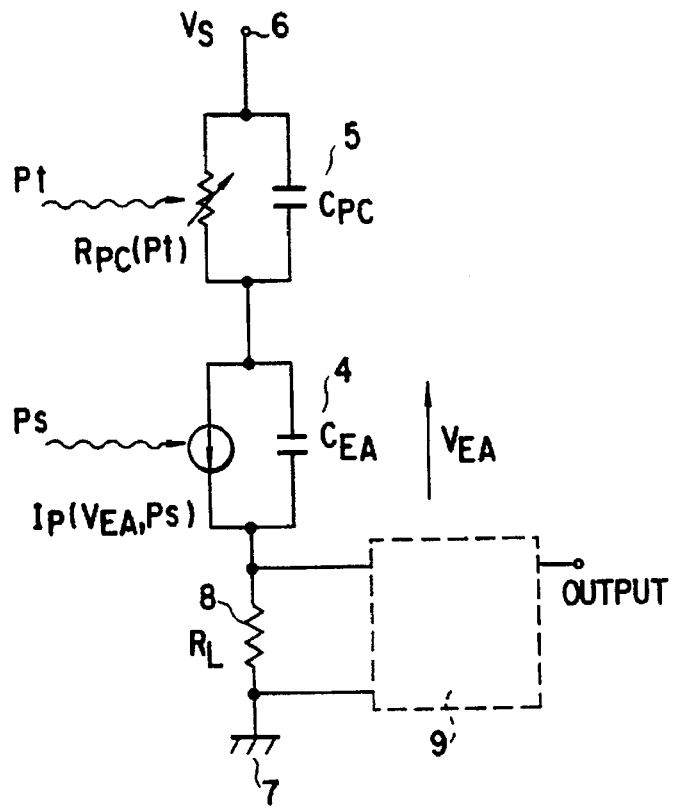
FIG. 7 is a circuit diagram showing an electrically equivalent circuit of the unit portion of the light-receiving device shown in FIG. 2.

FIG. 7 is a circuit diagram showing the light-receiving unit of the light-receiving device according to the first embodiment of the present invention, i.e., an electrically equivalent circuit of a unit portion including one electroabsorption region 4, one photoconductive switch 5, and one resistor 8 ($R_L$). The power supply voltage is 5 V.

While no light is incident on the second optical waveguide 3, an electric field of about 3 V is applied between the terminals of the optical switch 5, and an electric field of about 2 V is applied between the terminals of the electroabsorption region 4. The electroabsorption region 4 is in a transparent state with respect to signal light. Assuming that the resistance $R_L$ is 10 Ω, the voltage between the terminals of the electroabsorption region 4 increases to 4 V or more within 5 ps after incidence of light on the second optical waveguide 3. In this state, when a signal light pulse is incident from the first optical waveguide 2 onto the electroabsorption region 4, a photocurrent flows due to the electroabsorption effect by the QCSE. The signal light pulse width is 10 ps or less. The photocurrent is limited by the carrier sweep time and continues to flow for about 50 ps.

Figure 8:
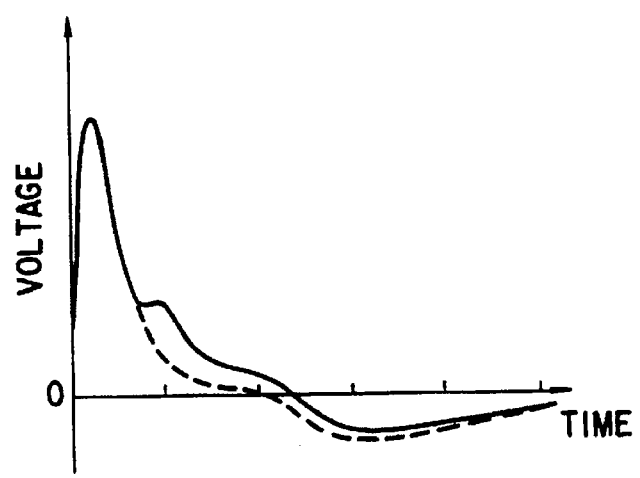
FIG. 8 is a graph showing a voltage waveform which appears in the resistor of the light-receiving device shown in FIG. 2.

FIG. 8 is a graph showing the voltage waveform observed when light is incident from the second optical waveguide 3 to the photoconductive switch 5. A solid line in FIG. 8 indicates a waveform obtained when a signal light pulse is incident from the first optical waveguide 2 onto the electroabsorption region 4, and a broken line indicates a waveform obtained without incidence of light. Even when no light is incident on the electroabsorption region 4, a large change in voltage is caused by a charge/discharge current according to the ON/OFF operation of the photoconductive switch 5.

However, when the timing of reception of the signal light pulse by the electroabsorption region 4 and the timing of detection of a voltage by the electronic circuit portion 9 are appropriately set, the change in voltage upon electroabsorption can be detected. Upon detection of this change, the electronic circuit portion 9 outputs an electrical pulse having a predetermined pulse width and a voltage at a predetermined timing.

Figure 9A:
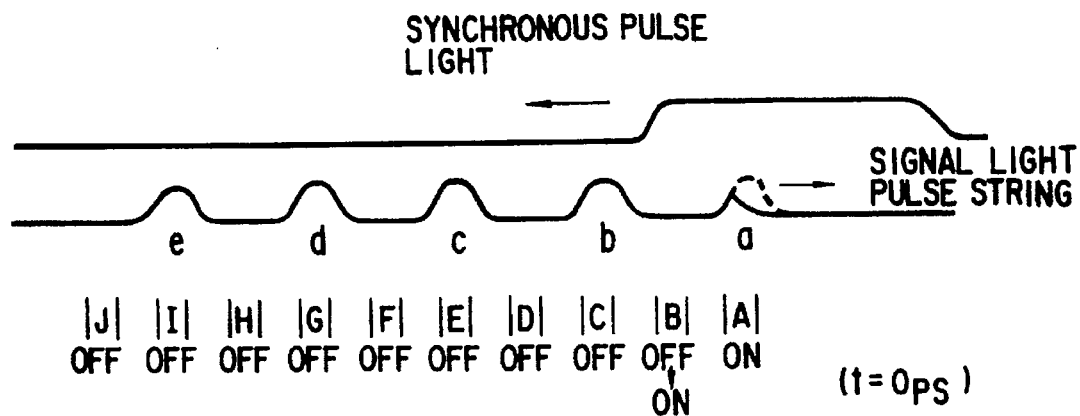
FIGS. 9A to 9C are views for explaining the operation timing of each light-receiving unit of the light-receiving device shown in FIG. 2.
Figure 9B:
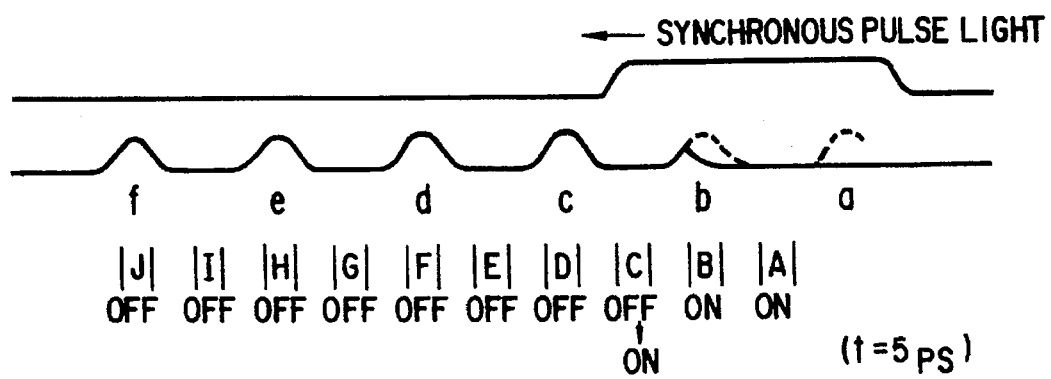
Figure 9C:
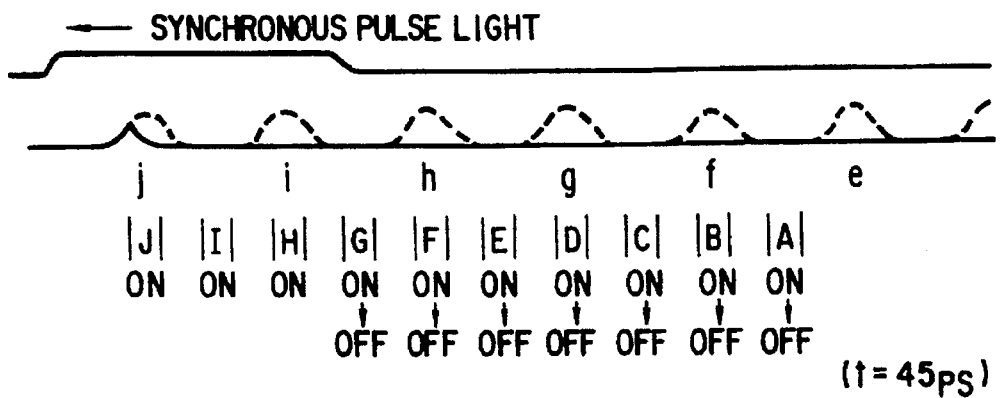

FIGS. 9A to 9C are views showing the operation timing of each light-receiving unit. A signal light pulse string has ten pulse slots a, b, c, ..., and j of 10 ps, and the signal light pulse with is 5 ps or less. In the signal light pulse string, these ten slots are defined as one unit. However, the pulse string units never continuously reach the light-receiving device, and a signal light pulse string and the next signal light pulse string are separated from each other by at least 100 ps.

The signal light pulse string propagates through the first optical waveguide 2 from the left side to the right side. Synchronous pulse light propagates through the second optical waveguide 3 from the right side to the left side. The light-receiving units are represented by A, B, C, ..., and J from the rightmost one (optical gate) to the leftmost one (optical gate). The pulse width of the synchronous pulse light is 20 ps.

The time slot interval of the signal light pulse is 10 ps. Assuming that the equivalent refractive index of the optical waveguide is 3, the slots are spatially arranged at an interval of 1 mm. Since the interval between the light-receiving units is 0.5 mm, when the slot a with a signal light pulse reaches the light-receiving unit A, the slots b to e are at the light-receiving units C, E, G, and I, respectively, and the slots f to j do not reach any light-receiving unit yet.

Assume that the leading edge of the synchronous pulse starts to pass the photoconductive switch 5 at the light-receiving unit A about 7 ps before the slot a reaches the electroabsorption region 4 at the light-receiving unit A. In this case, the electroabsorption region 4 at the light-receiving unit A is switched to the light absorption state within 5 ps. If a light pulse is present at the slot a reaching in 2 ps, the operation of the corresponding electronic circuit portion 9 is turned on (FIG. 9A).

At this point of time, the electroabsorption regions 4 at the light-receiving units C to J are in the transparent state. The electroabsorption region 4 at the light-receiving unit B is not completely switched to the absorption state yet although the leading edge of the synchronous pulse light reaches the light-receiving unit B. Additionally, the signal light at the slot b is still at the light-receiving unit C, and the signal light at the slot a has already been transmitted. Therefore, the light-receiving unit B does not generate an output.

The signal light at the slot b reaches the light-receiving unit B after 5 ps. At this point of time, the electroabsorption region 4 at the light-receiving unit B is switched to the light absorption state. For this reason, if a light pulse is present at the slot b, the operation of the corresponding electronic circuit portion 9 is turned on (FIG. 9B). Since the light pulse at the slot b is completely absorbed in the electroabsorption region 4 at the light-receiving unit B and does not reach the light-receiving unit A. The leading edge of the synchronous pulse light reaches the light-receiving unit C, and the electroabsorption region 4 at the light-receiving unit C starts to be switched to the absorption state. However, the slot b has already passed while the slot c does not reach yet.

Similarly, in accordance with propagation of the synchronous pulse and the signal light pulse string, the light-receiving units C to J sequentially perform the light-receiving operation according to the light signals at the slots c to j. A delay of 45 ps is present from the start of the operation of the light-receiving unit A to the start of the operation of the light-receiving unit J (FIG. 9C). However, electrical signals can be simultaneously parallelly output by setting synchronous gates to the electronic circuit portions 9. Synchronization can also be set by adjusting the delay time in accordance with the length of the electric wiring.

For each light-receiving unit, switching to the OFF state requires a longer time than switching to the ON state. Since a minimum time interval from incidence of the signal light pulse j on this light-receiving device to incidence of the first pulse a of the subsequent signal light pulse string is 110 ps, the light-receiving unit J must be restored to the OFF state within about 100 ps after switching to the ON state.

In the first embodiment, the above condition is satisfied because the synchronous light pulse width is 20 ps, and both the electroabsorption region 4 and the photoconductive switch 5 have an OFF time of 50 ps or less. The electronic circuit portion 9 must generate one output every 200 ps and have a band of 5 Gb/s. The electronic circuit portion 9 need not always be formed monolithically with the light-receiving element and may also have a hybrid structure with an Si-LSI.

As described above, in the light-receiving device according to the first embodiment of the present invention, ten at an interval strings reaching at an interval of 10 ps can be read as ten parallel electrical signals. The light-receiving device having the demultiplexing function of the present invention can be integrated on a single semiconductor chip, thereby achieving a simple, compact, and stable arrangement, and a low dependency on polarization. In addition, since one synchronous light pulse can be shared by a plurality of light-receiving units as a trigger, the energy utilization efficiency is increased. With these effects, a practical optoelectronic demultiplexing function which is not available in the prior art can be realized at a low cost.

Second Embodiment

A light-receiving demultiplexer according to the second embodiment of the present invention will be described below. This light-receiving demultiplexer is a 1:32 light-receiving demultiplexer which receives four sets of pulse string light signals as one unit, each of which consists of eight pulses at an interval of 10 ps, and outputs 32-bit parallel electrical signals at a data rate of 2.5 Gb/s.

In the above first embodiment, for 100 ps after reception of one light pulse string, the next pulse string cannot be received. However, in the second embodiment, a plurality of light-receiving devices are parallelly arranged. With this arrangement, signals can be continuously received except for a guard time of 10 ps and synchronous slot of 10 ps, which are provided every 100 ps. Therefore, the data rate of an optical TDM signal can be decreased from 80 Gb/s to 2.5 Gb/s at one stage.

Figure 10:
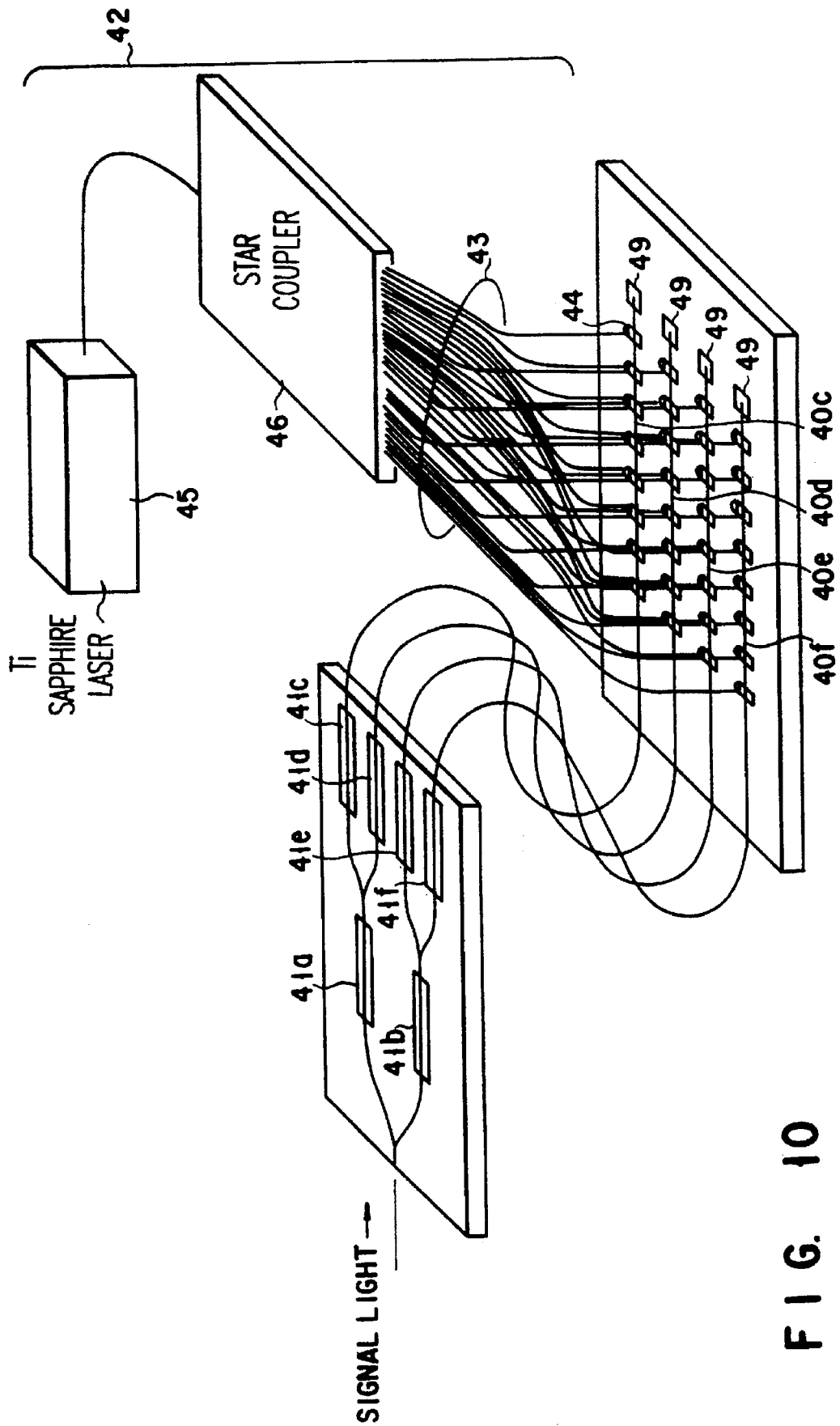
FIG. 10 is a view schematically showing the arrangement of a light-receiving demultiplexer according to the second embodiment of the present invention.

FIG. 10 is a view schematically showing the arrangement of the light-receiving demultiplexer according to the second embodiment of the present invention. The light-receiving demultiplexer according to the second embodiment is mainly constituted by four 8-parallel-output semiconductor light-receiving devices 40 (40c to 40f) having the similar arrangement as the light-receiving device of the first embodiment, six electroabsorption type optical gate switches 41 (41a to 41f) for distributing light to the four light-receiving units, and a synchronous light pulse supply system 42. The semiconductor light-receiving devices 40 and the optical gate switches 41 are coupled to each other through optical fibers.

The electroabsorption type optical gate switches 41a to 41f are driven with large-amplitude sine waves having a frequency of 2.5 GHz and set such that switching between the transparent state and the absorption state is performed every 200 ps. The sine wave for driving the optical gate switches 41c and 41f are phase-shifted from that for driving the optical gate switch 41a by $\pi/2$ on the time axis with reference to a light pulse. The optical gate switches 41b, 41d, and 41e are driven in phases opposite to those for the optical gate switches 41a, 41c, and 41f, respectively.

Figure 11:
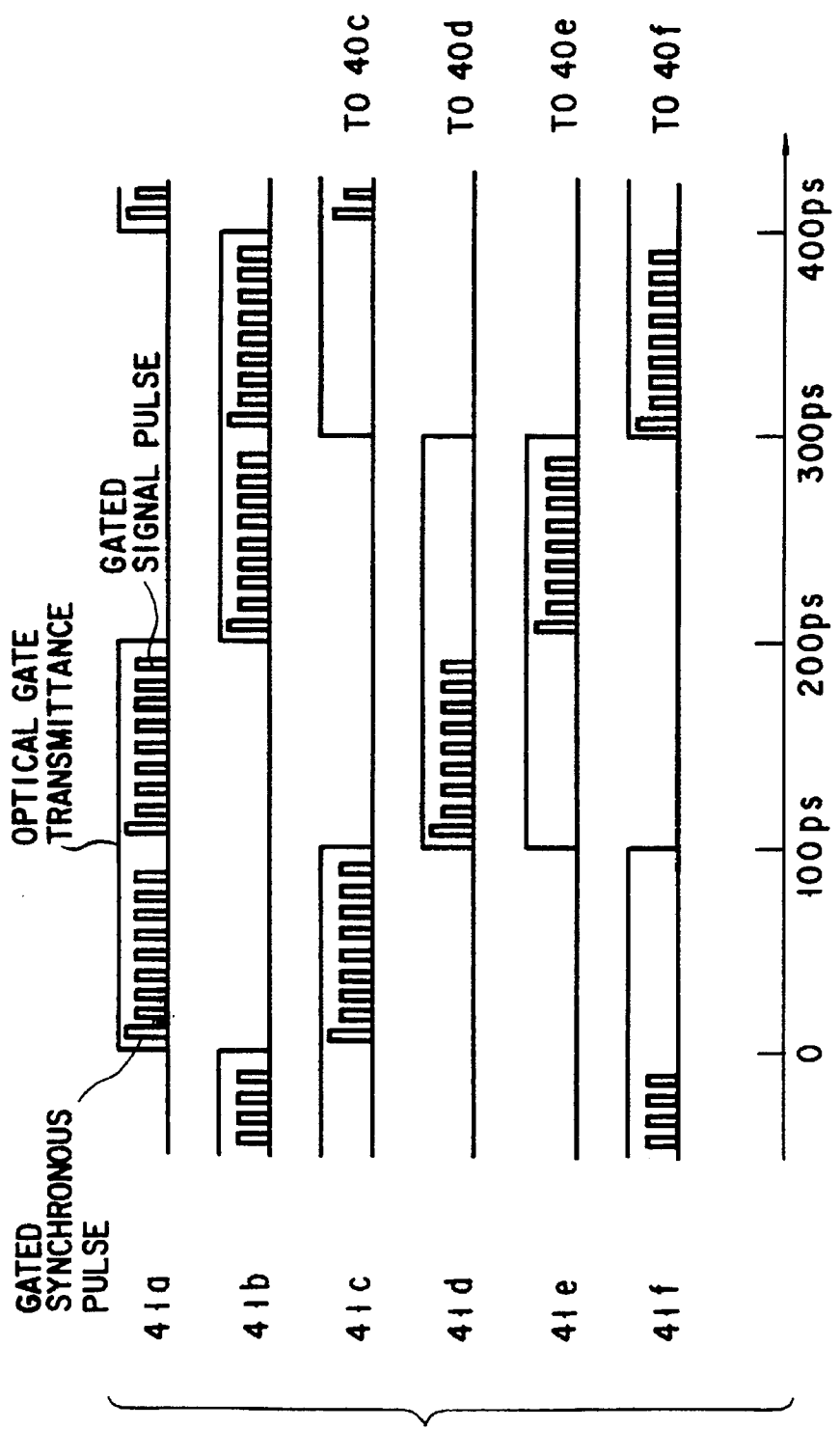
FIG. 11 is a view for explaining the light pulse distribution operation of the light-receiving demultiplexer shown in FIG. 10.

Synchronization is established such that the timing of switching between the transparent mode and the absorption mode matches the guard time of the signal light pulse string. As a result, as shown in FIG. 11, eight light pulse strings are distributed to each semiconductor light-receiving device 40 at an interval of 10 ps every 400 ps.

The arrangement of the first optical waveguide and the electroabsorption region of the semiconductor light-receiving device 40 of the second embodiment is almost the same as in the first embodiment. However, this light-receiving device has no second optical waveguide. A synchronous light pulse is supplied to each photoconductive element 44 through distribution optical fibers 43 of the synchronous light pulse supply system 42.

The synchronous light pulse supply system 42 is constituted by a Ti sapphire laser 45 for emitting a pulse having a pulse width of 30 ps every 400 ps in synchronism with a signal light pulse string, a star coupler 46, the distribution optical fibers 43, and the like. By adjusting the length of each distribution optical fiber 43, the timing of triggering each photoconductive element 44 is adjusted. When the delay time of the optical fiber 43 is changed, the interval between the electroabsorption regions 4 can also be changed to a value different from that in the first embodiment.

Figure 12:
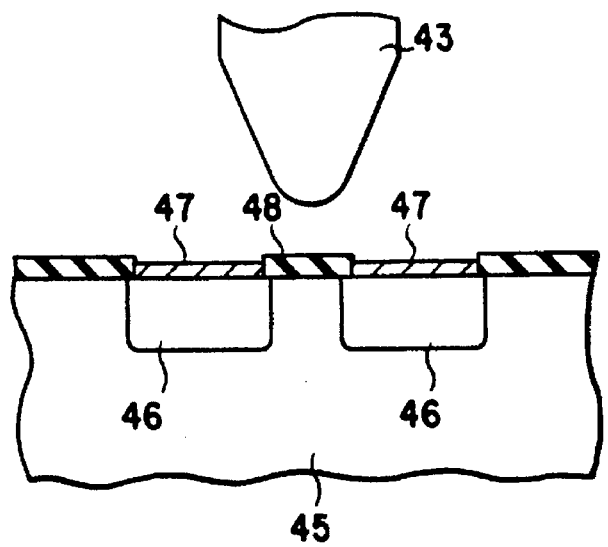
FIG. 12 is a sectional view schematically showing the structure of the photoconductive element of the light-receiving device shown in FIG. 10.

FIG. 12 is a sectional view showing the structure of the photoconductive element 44. This photoconductive element 44 is constituted by n-type InP layers 46 formed in a semi-insulating InP substrate 45 at an interval of 1 μm, metal electrodes 47 formed on the n-type InP layers 46, and an antireflection coating film 48. While no light is incident, a high-resistance state of several MΩ or more is maintained. However, the resistance decreases to several Ω immediately after incidence of a light pulse. As a result, as in the first embodiment, a voltage applied to the electroabsorption region 4 is increased to switch the electroabsorption region 4 from the transparent state to the absorption state. Other operations of each semiconductor light-receiving devices are almost the same as in the first embodiment.

Actually, synchronization between the transmission device and this light-receiving device is required. At the start of the operation, pulse light is transmitted for only a predetermined time of a total of 400 ps at a predetermined timing and compared with a parallel reception output pattern, thereby roughly setting synchronization. During a normal operation, synchronization is roughly established. For this reason, when triggering is executed with a light pulse at a synchronous slot provided 10 ps before the signal pulse string, proper synchronization can be established. For this purpose, pin photodiodes 49 (FIG. 10) are integrated at the deepest portion of the first optical waveguide 2 of the light-receiving device 40.

According to the light-receiving demultiplexer of the Second embodiment, an optical TDM signal at a data rate of 80 Gb/s can be converted into 32-bit parallel electrical signals at a data rate of 2.5 Gb/s. As in the first embodiment, a simple, compact, and stable arrangement, and a low dependency on polarization can be achieved, and the energy utilization efficiency is also increased. The light-receiving devices 40 and the electroabsorption type optical gate switches 41 can also be integrated on a single semiconductor substrate.

Third Embodiment

In the second embodiment, the application of the present invention to a fixed optical TDM system has been described. However, application of the present invention is not limited to such a fixed optical transmission system. The third embodiment to be described below is related to an add-drop type optical TDM transmission apparatus using the light-receiving device of the present invention.

Figure 13:
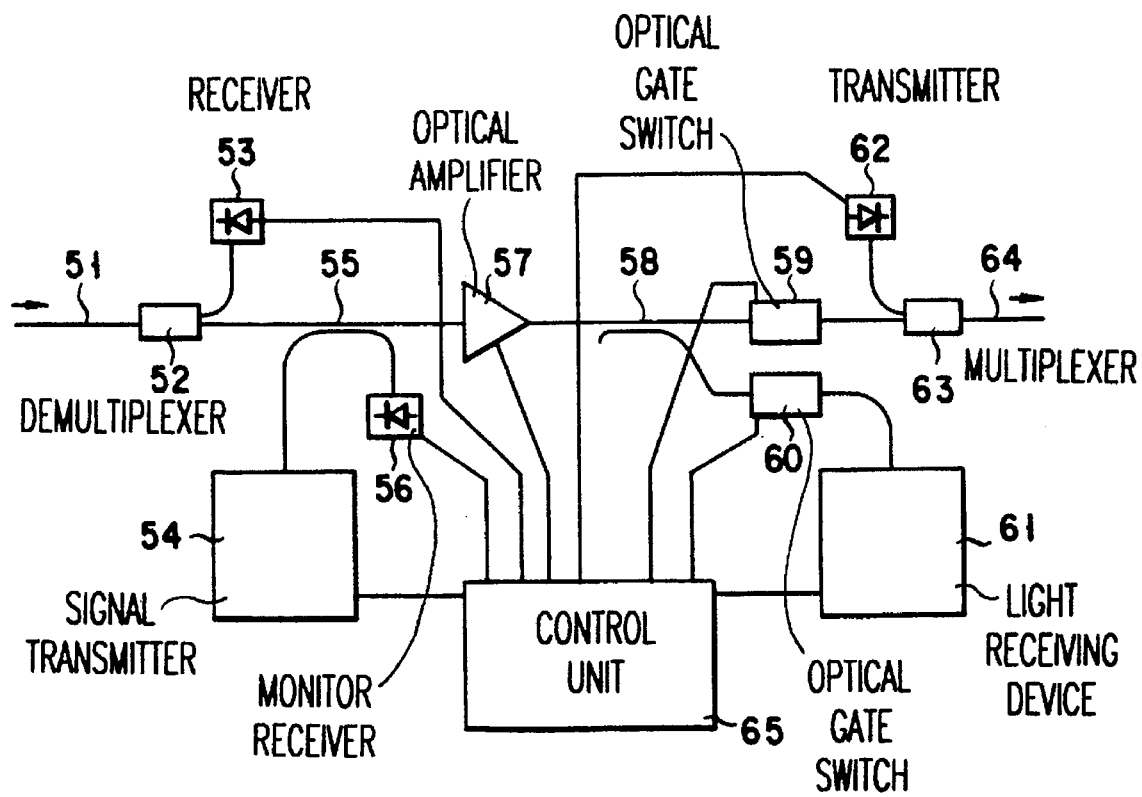
FIG. 13 is a view showing the arrangement of a node of an optical transmission apparatus according to the third embodiment of the present invention.

FIG. 13 is a view schematically showing the arrangement of one node of an optical TDM transmission apparatus according to the third embodiment of the present invention. This node is constituted by an input optical fiber 51, a wavelength demultiplexer 52, a routing control signal receiver 53, a signal transmitter 54, an optical coupler 55, a monitor receiver 56, an optical amplifier 57, an optical coupler 58, electroabsorption type optical gate switches 59 and 60, a semiconductor light-receiving device 61, a routing control signal transmitter 62, a wavelength multiplexer 63, an output optical fiber 64, a control unit 65, and the like.

Signal light is multiplexed by optical TDM in units of 8-bit (1-byte) signal strings (length: 80 ps) at an interval of 10 ps, and transmitted through the input optical fiber 51. The length of a slot for receiving a 1-byte light signal is 100 ps of which 20 ps is defined as a guard time. Multiplexing is performed such that byte signals for the same destination are not received by adjacent slots.

A routing control light signal transmitted through the input optical fiber 51 at a wavelength different from that of a data light signal is demultiplexed by the wavelength demultiplexer 52, received by the routing control signal receiver 53, and sent to the control unit 65. The control unit 65 selects a byte signal string to be received by this node through the optical gate switch 60 and sends the signal string to the light-receiving device 61. On the other hand, a light signal to be sent to the next node is selected through the optical gate switch 59 and sent to the output optical fiber 64.

In a case of a multiaddress-type signal, both the optical gate switches 59 and 60 are turned on. The optical gate switches 59 and 60 must operate as a light intensity modulator at a data rate of 10 Gb/s. However, to complete switching within the guard time, the switching time must be 10 ps or less. For this purpose, high-speed and large-amplitude driving is required.

The light-receiving device 61 has the same arrangement as that of the first or second embodiment and can parallelly read a 1-byte light signal string. More specifically, electroabsorption regions 4 are sequentially switched to the absorption state by synchronous light pulses at timings designated by the routing control signal, and each electroabsorption region 4 reads each bit information.

When a signal is to be sent to another node, the control unit 65 searches a vacant slot in accordance with the routing control light signal received by the routing control signal receiver 53, and outputs a light signal string in units of bytes to the vacant slot by using the signal transmitter 54 and the optical coupler 55 through the output optical fiber 64. Regardless of a signal to be relayed from the input optical fiber 51 or a signal to be sent from the signal transmitter 54, necessary routing control information is wavelength-multiplexed and transmitted from the routing control signal transmitter 62 to the routing control signal receiver of the next node through the wavelength multiplexer 63 and the output optical fiber 64.

The optical amplifier 57 compensates a power loss in the optical coupler 55 and 58, the optical gate switches 59 and 60, the optical fibers 51 and 64, and the like, and also functions as a delay line for delaying signal light with respect to the routing control signal. As a result, upon reception of the routing control signal, the control unit 65 can finish preparation of transmission/reception/relay before the corresponding signal light is incident. The monitor receiver 56 is used to monitor the transmission signal level or a relay signal level, or detect an abnormality.

In the optical transmission apparatus of the third embodiment, multiplexing is performed in units of 1-byte (8-bit) light pulse strings which can be simultaneously received by a single integrated light-receiving device. In the conventional optical TDM, multiplexing is often performed in units of bits or cells. However, in a network where the signal destination is not fixed, multiplexing in units of bits requires very-high-speed routing of a signal in units of bits, resulting in an increase in energy or time necessary for switching. On the other hand, in a very-high-speed optical TDM performed in units of cells, routing is facilitated. However, a long light signal string is compressed and arrives in a short time, resulting in difficulty in processing on the light-receiving device side.

To the contrary, in byte multiplexing according to the third embodiment, one switching operation is performed every eight pulses. For this reason, the energy utilization efficiency is higher than that in bit multiplexing, and the dead time can also be shortened. Additionally, since the number of pulses simultaneously arriving is as small as eight, electrical processing in the light-receiving device is facilitated.

However, when a routing overhead is added every byte, the overhead becomes too heavy. For this reason, it is preferable to add one overhead every several bytes and send a pulse string in units of bytes a predetermined number of times at a period designated to the overhead. That is, this system can be considered as a system for sending the cell pulses with disassembling the cell into several units of pulses.

For a 53-byte (424-bit) ATM (asynchronous transfer mode) cell, a pulse string in units of bytes is periodically sent 53 times. A signal pulse string unit for another destination is always inserted between bytes. The overhead is transmitted as a routing control signal at another wavelength once per 53 transmission operations prior to transmission of a data signal. When the signal rate before transmission and after reception is 2.5 Gb/s, one byte is preferably transmitted/received every 32 slots. In this case, information corresponding to 32 cells is multiplexed in units of bytes at a fixed length of 169.6 ns.

In the third embodiment, only one optical amplifier is used for transmission, reception, and relay. For this reason, the transmission optical coupler 55 is inserted before the reception optical coupler 58 and the optical gate switch 60. When this order is changed to arrange the transmission optical coupler 55 after the optical gate switch 60, a slot used for reception in this node can be used for transmission from this node again.

The optical transmission apparatus according to the third embodiment can be variously modified and applied. For example, all of the optical coupler 58, the electroabsorption type optical gate switches 59 and 60, the light-receiving device 61, the routing control signal transmission unit 62, and the wavelength multiplexer 63 can be integrated on a single semiconductor substrate. As in the second embodiment, when a plurality of light-receiving devices and optical gate switches for light distribution are arranged, processing in units of longer signal pulse strings can also be performed.

According to the optical transmission apparatus of the third embodiment, an optical TDM network capable of handling a large-capacity information at a rate of 80 Gb/s per one transmission fiber can be constituted. The optoelectronic demultiplexing unit which is an obstacle for practical use of the conventional optical TDM transmission system can be constituted by a compact, lightweight, and a stable semiconductor. In addition, this network enables a flexible operation which is impossible in the conventional optical TDM network, i.e., repetitive use of a vacant slot or coping with broadcast communication.

Fourth Embodiment

Figure 14:
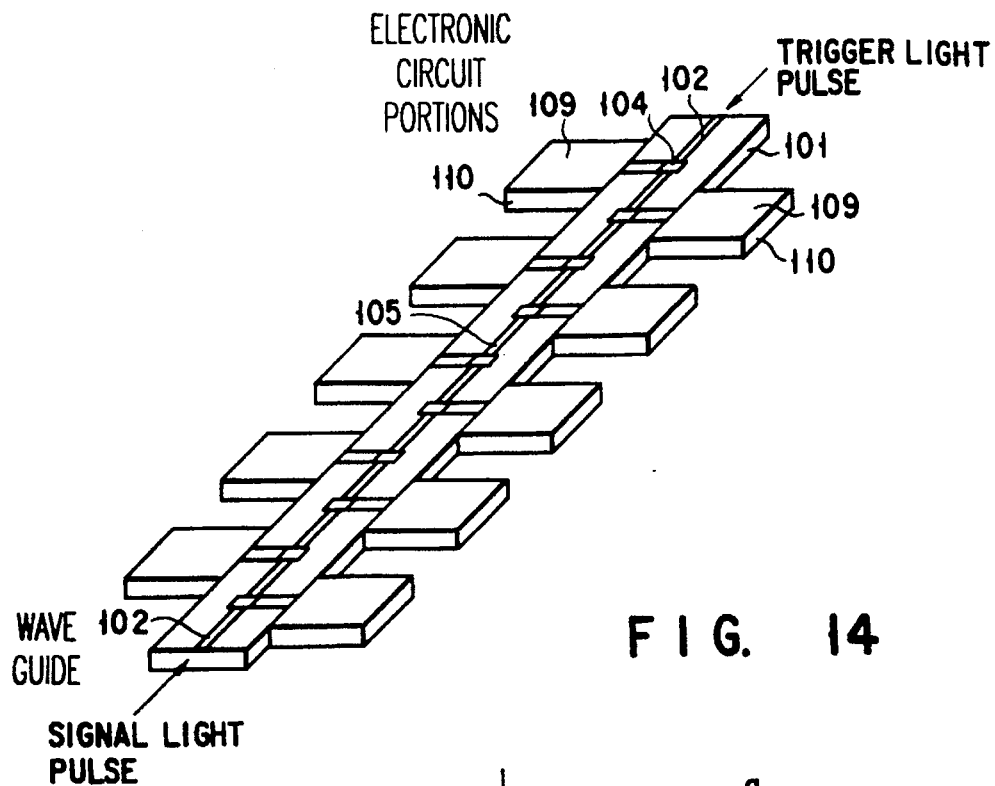
FIG. 14 is a view schematically showing the arrangement of a light-receiving device according to the fourth embodiment of the present invention.

FIG. 14 is a view schematically showing the arrangement of a light-receiving device according to the fourth embodiment of the present invention.

This light-receiving device is constituted by an optical waveguide 102 formed on an n-type InP semiconductor substrate 101, ten optical gates 104 formed along the optical waveguide 102 at a period of about 0.5 mm and having a length of 0.1 mm, and ten electronic circuit portions (read circuits) 109 formed on Si substrates 110 arranged on both the sides of the InP substrate 101 in correspondence with the optical gates 104. The electronic circuit portions 109 are alternately arranged on the right and left sides of the optical waveguide 102 to reduce interference with adjacent channels.

A signal light pulse string having a wavelength of 1.55 µm at a data rate of 100 Gb/s RZ (return-to-zero) can be input from one end of the optical waveguide 102. An anti-reflection coating film is formed on the incident end face, and efficient coupling with the optical fiber is realized through a pair of aspherical lenses. The peak power of the signal light itself is in several mW order, so no conspicuous optical Stark effect is obtained.

On the other hand, a trigger light pulse having a wavelength of 3.5 µm can be input from the other end of the optical waveguide 102. This trigger light pulse can be obtained such that pulse light output from a semiconductor laser or fiber ring laser having a wavelength of 1.55 µm is amplified and pulse-compressed, and thereafter, wavelength-converted by an optical parametric oscillator. The pulse width is 9 ps, the repetition period is 100 ps, and the peak power is about 30 mW. The trigger light is set to propagate through the optical waveguide 102 in the TM mode.

FIG. 15 is a view schematically showing the sectional structure of the optical gate 104. An i-type multiple quantum well layer 111 having a well width of about 5 nm and consisting of tensile strained InGaAsP well layers 112 and compressive strained InGaAlAs barrier layers 113, and a guide layer 114 having a thickness of 0.1 μm and consisting of InGaAsP are formed on the n-type InP substrate 101. A p-type InP cladding layer 115 and a p-type InGaAsP ohmic contact layer 116 are formed into a mesa on the guide layer 114. The mesa width is about 2 μm, and its side surfaces are buried with a polyimide layer 121. An ohmic electrode 122 is formed on the surface of the p-type ohmic contact layer 116 while a common ground ohmic electrode 123 is formed on the lower surface of the n-type InP substrate 101. A wiring layer 124 for connecting the optical gates 104 to the corresponding electronic circuit portions 109 is formed on the polyimide layer 121.

FIG. 16 is a sectional view schematically showing the sectional structure of a portion 105 of the optical waveguide 102, which is different from the optical gates. The i-type multiple quantum well layer 111 and the guide layer 114, which are common to the optical gates 104, are formed on the n-type InP substrate 101. A semi-insulating InP layer 117 is formed into a mesa having a width of 2 μm on the guide layer 114. The side surfaces of this mesa are buried with the polyimide later 121. The common ground electrode 123 is formed on the lower surface of the n-type InP substrate 101.

Figure 17:
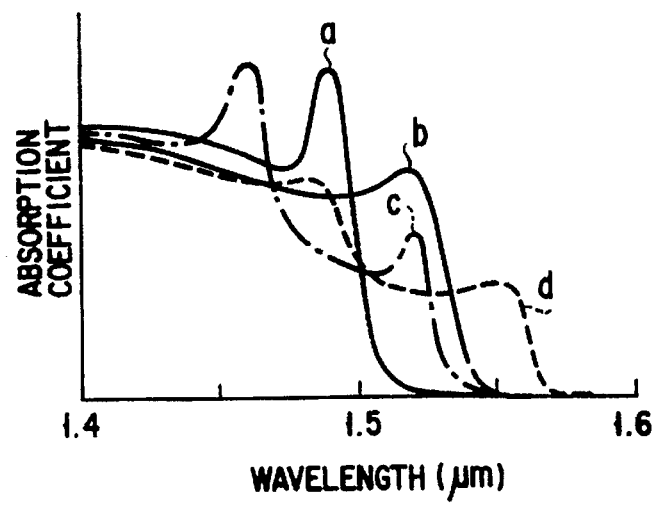
FIG. 17 is a graph for schematically explaining the absorption characteristics of the multiple quantum well layer of the light-receiving device shown in FIG. 14.

The i-type multiple quantum well layer 111 is depleted even while no voltage is applied because of the diffusion potential of pin junction. The absorption spectrum of the multiple quantum well layer 111 is changed by the QCSE (quantum confined Stark effect) in accordance with an applied voltage. FIG. 17 is a graph schematically showing the absorption characteristics. The exciton absorption wavelength observed when no voltage is applied (curve a) is about 1.49 μm. The exciton absorption wavelength observed when a reverse bias voltage of 2 V is applied (curve b) is about 1.52 μm. In either case, the absorption coefficient with respect to a signal light wavelength of 1.55 μm is small (transparent mode). Since the tensile strained quantum well is used, the difference in absorption characteristics between the TE mode and the TM mode is small.

A reverse bias of about 2 V is applied to each optical gate 104 through the electrodes 122 and 123 (curve b). A capacitance $C_{EA}$ of the optical gate 104 is about 0.1 pF. On the other hand, no external field is applied to the multiple quantum well layer 111 of the portions 105 of the optical waveguide 102, which are different from the optical gates (curve a).

Figure 18:
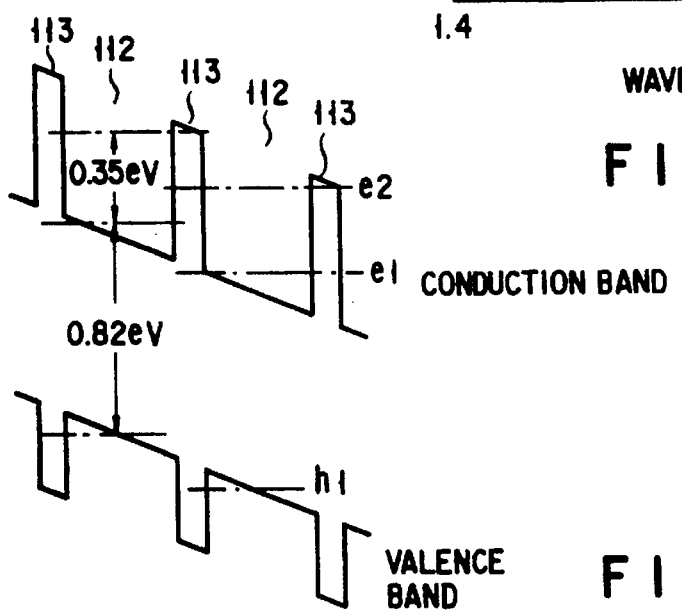
FIG. 18 is a view for schematically explaining the band structure of the multiple quantum well layer of the light-receiving device shown in FIG. 14.

FIG. 18 is a view schematically showing the band structure of the multiple quantum well layer 111. The conduction band of the well layer 112 has two subbands. The intersubband transition energy is about 0.35 eV which corresponds to a wavelength of about 3.5 μm. Since the multiple quantum well layer 111 is depleted, it is transparent with respect to a trigger light pulse having a wavelength of 3.5 μm.

Curves c and d in FIG. 17 indicate changes in absorption spectrum by the optical Stark effect, which are observed when the trigger light pulse having the wavelength of 3.5 μm is incident on the multiple quantum well layer 111. The peak power of the trigger light is about 30 mW, and an optical field strength $E_t$ is about $2 \times 10^6$ V/m. A dipole moment $\mu_t$ of intersubband transition is approximated by 1.6 $eL_w$ where $L_w$ is the well width, and e is electric charges of electrons, and becomes about $1.3 \times 10^{-27}$ Cm when $L_w$ is 5 nm or less. Therefore, a Rabi frequency $\Omega = 2\pi\mu_t E_t/h$ corresponds to about $2.5 \times 10^{13}$/s. When this value is substituted into equation (1), $\lambda_0'$ is about 1.55 μm with respect to $\lambda_0 = 1.52$ μm.

More specifically, the exciton absorption wavelength of the optical gate 104 splits into a wavelength of about 1.49 μm and a wavelength of about 1.55 μm by the Rabi splitting (curve d). Similarly, the exciton absorption wavelength of the portion 105 of the optical waveguide 102, which is different from the optical gate, splits into a wavelength of about 1.46 μm and a wavelength of about 1.52 μm (curve c). The band edge wavelength is also red-shifted in accordance with the split of the exciton absorption wavelength.

The shift amount of the band edge wavelength slightly varies depending on the position or time because of a loss in the optical gates 104 or variations in power in the trigger light pulse with time. In any case, however, the absorption coefficient at the wavelength of 1.55 μm increases to set the light-receiving mode. After the trigger light pulse passes, the original transparent mode is immediately restored. On the other hand, the absorption coefficient of the portion 105 different from the optical gate at the wavelength of 1.55 μm is kept small even when the trigger light pulse is present.

When a signal light pulse string propagates to the optical gates 104 in the light-receiving mode, the signal light is absorbed to generate photocarriers. While a voltage of 2 V is applied, a high electric field of about 200 kV/cm is applied to the multiple quantum well layer 111 of the optical gate 104. For this reason, holes generated upon light absorption are transported to the p-type InP cladding layer 115 within 50 ps without being captured by a heterobarrier. Electrons have a mobility higher than that of the holes by about 10 times and transported to the n-type InP substrate 101 which also serves as an n-type cladding layer in a shorter time.

FIGS. 19A to 19D are views showing the operation timings of each optical gate 104. The first signal light pulse string has ten times slots a, b, c, . . . , and j each having a width of 10 ps, and the signal light pulse width is 5 ps or less. The signal light pulse string operates in units of these ten time slots and is followed by the second signal light pulse string consisting of slots k, l, . . . , and t. Assume that the slots a, b, c, e, f, j, k, n, p, and s have pulses, and the remaining slots have no pulse. The signal light pulse string propagates through the optical waveguide 102 from the left side to the right side of the drawing, and the trigger light pulse propagates through the optical waveguide 102 from the right side to the left side. The optical gates are represented by A, B, C, . . . , and J from the rightmost one toward the leftmost one. Referring to FIGS. 19A to 19D, only the optical gates with encircled reference symbols are in the light-receiving mode. The pulse width of the trigger light pulse is 9 ps.

Figure 19A:
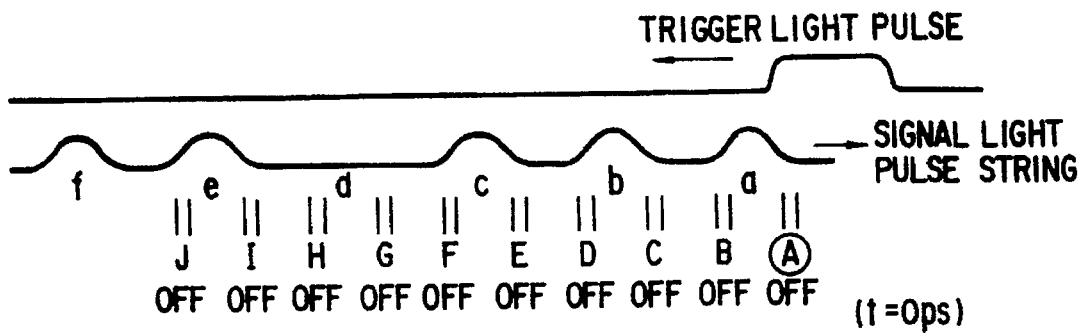
FIGS. 19A to 19D are views for explaining the operation timings of each optical gate of the light-receiving device shown in FIG. 14.

Assume that, at time t=0 ps, the slot a having a signal light pulse reaches the left end of the optical gate A, and the leading edge of the trigger light pulse reaches the left end of the optical gate A 1 ps before that (FIG. 19A). The time slot interval between the signal light pulses is 10 ps. Assuming that the equivalent refractive index of the optical waveguide is 3, the signal light pulses are spatially arranged at an interval of 1 mm. The period of the optical gates is 0.5 mm. Therefore, the leading edges of the slots b, c, d, and e are at the left ends of the optical gates C, E, G, and I, respectively, when t=0 ps. The slots f to j do not reach the optical gate J at the left end yet.

When time t=−1 ps to 7 ps, the entire region of the optical gate A is set in the light-receiving mode. For this reason, during t=0 ps to 6 ps when the signal light pulse at the slot a passes through the optical gate A with a length of 0.1 mm, the operation of the corresponding electronic circuit portion is enabled. In the light-receiving mode, an extra time of 1 ps is set before and after the pulse as a margin against a timing offset.

The leading edge of the trigger light pulse reaches the right end of the optical gate B when t=3 ps. When t=1 ps, the trailing edge of the signal light pulse at the slot a passes the right end of the optical gate B. Therefore, after the signal light pulse at the slot a passes through the optical gate B, the optical gate B starts to be switched from the transparent mode to the light-receiving mode.

Figure 19B:
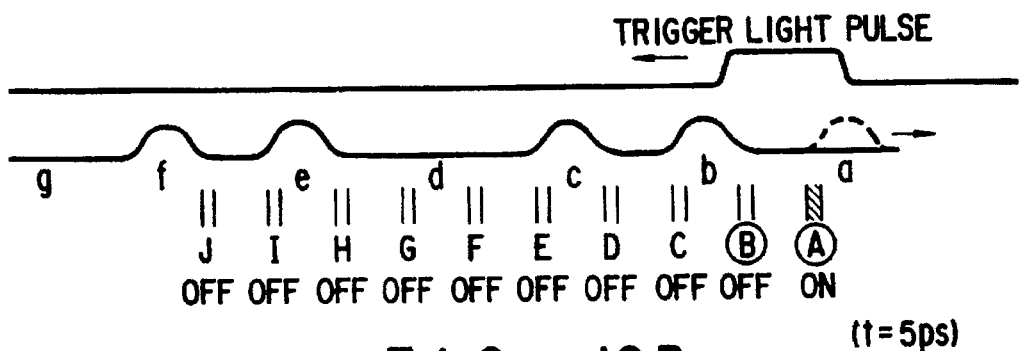

The leading edge of the trigger light pulse reaches the left end of the optical gate B when t=4 ps. When t=5 ps, the signal light pulse at the slot b reaches the left end of the optical gate B. At this time, the entire region of the optical gate B has already been switched to the light-receiving mode (FIG. 19B). Therefore, the signal light pulse at the slot b is immediately received to turn on the electronic circuit portion corresponding to the optical gate B.

Most of the light pulse energy at the slot b is absorbed by the optical gate B, so the signal light pulse does not reach the optical gate A. Even if the signal light pulse at the slot b is insufficiently absorbed by the optical gate B, a photocurrent output from the optical gate A is not influenced by the light at the slot b because the entire region of the optical gate A is switched to the transparent mode at t=9 ps which is 1 ps before the pulse leading edge at the slot b reaches the optical gate A.

Figure 19C:
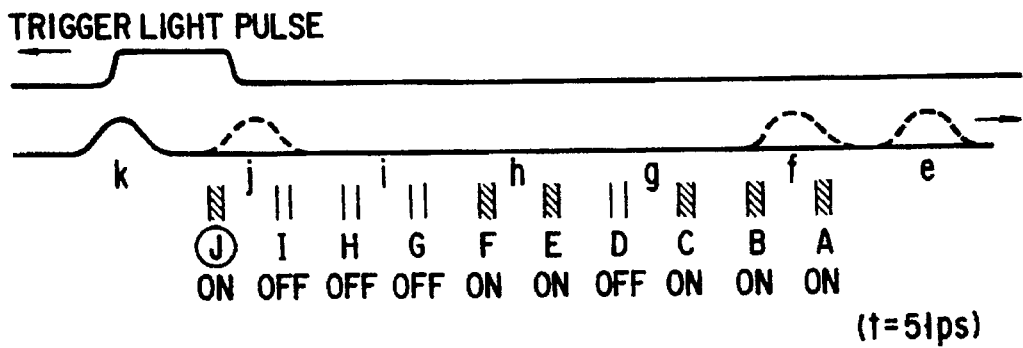

Similarly, the optical gates C to J sequentially perform the light-receiving operation in accordance with the presence/absence of the signal light pulses at the slots c to j as the trigger light pulse and the signal light pulse string propagate. A time of 51 ps is required until completion of the light-receiving operation of the optical gate J (FIG. 19C). However, when a synchronous gate is set to the electronic circuit portion 109, electrical signals can be simultaneously parallelly output. In addition, synchronization can be established by adjusting the delay time in accordance with the length of an externally connected electric wire.

As a result, parallel electrical outputs can be obtained from the electronic circuit portions (corresponding to the optical gates A, B, C, E, F, and J) in correspondence with the time-series signal light pulse string patterns a, b, c, e, f, and j.

The trigger light pulse propagating up to the end of the optical waveguide 102 can be removed using an externally arranged optical filter or optical isolator not to propagate through the signal transmission optical fiber. It may be separated by a wavelength demultiplexer to monitor the operation.

Switching between the transparent mode and the light-receiving mode by the trigger light pulse is instantaneously performed. Even when the light-receiving mode is switched to the transparent mode, the photocurrent continues to flow until carriers generated upon the light-receiving operation are extracted (ON state). During this time, even if a light signal at another slot passes through the optical gate 104, the operation is not influenced because the optical gate is switched to the transparent mode, so a new light-receiving operation cannot be performed. As is known for a electro-absorption type optical modulator, the time required to extract carriers can be set to 50 ps or less.

Figure 19D:
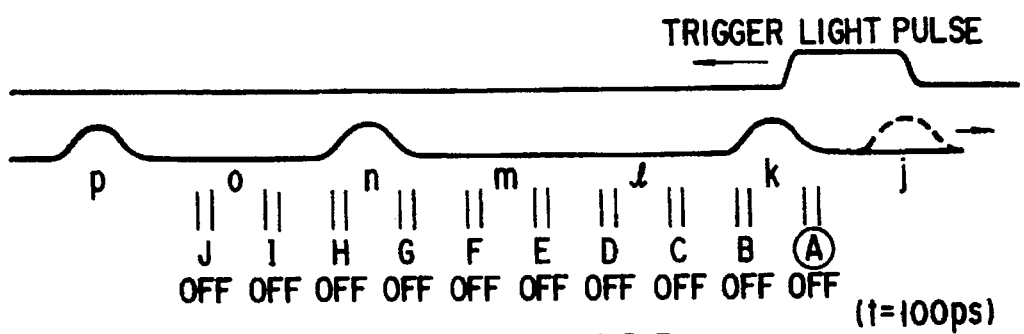

The light-receiving operation of the second signal light pulse string, i.e., the slots k to t reaching the light-receiving device immediately after the slot j will be considered below. When t=55 ps, the slot k reaches the left end of the optical gate 104J. However, when t=53 ps, all the optical gates 104A to 104J are switched to the transparent mode. The time when the slot k reaches the left end of the optical gate 104A is t=100 ps (FIG. 19D). At this time, the optical gate 104A has finished the operation associated with the slot a and is restored to the OFF state. When t=99 ps, the entire region of the optical gate 104A is switched to the light-receiving mode by the second trigger light pulse. Therefore, as in the slot a, the light-receiving operation of the slot k is started. Similarly, the light-receiving operation of the slots l to t is performed by the optical gate 104B to 104J. As a result, the electronic circuit portions 109A, 109D, 109F, and 109I respectively corresponding to the slots k, n, p, and s with the light pulses output parallel electrical signals.

By repeating this operation, a continuous demultiplexing light-receiving operation from the time-series light pulse string at a data rate of 100 Gb/s to the 10-channel parallel electrical signal at a data rate of 10 Gb/s can be realized.

The electronic circuit portion 109 must generate one output every 100 ps and have a bandwidth of 10 Gb/s. The electronic circuit portion 109 has normal input/output threshold characteristics, and outputs having almost the same voltage can be obtained even when photocurrents generated by the optical gates 104 slightly differ.

The electronic circuit portions 109 may be formed monolithically with the light-receiving element. In addition, as in a modification of FIG. 20, an InP chip on which an optical waveguide 142 and an optical gate 144 are integrated may be mounted as a flip chip on Si substrate 130 on which all the electronic circuit portions 109 are integrated. In this case, when alignment grooves 131 and 132 for the input and output optical fibers are integrated on the Si substrate 130, alignment of optical fibers 133 and 134 can be facilitated.

Figure 20:
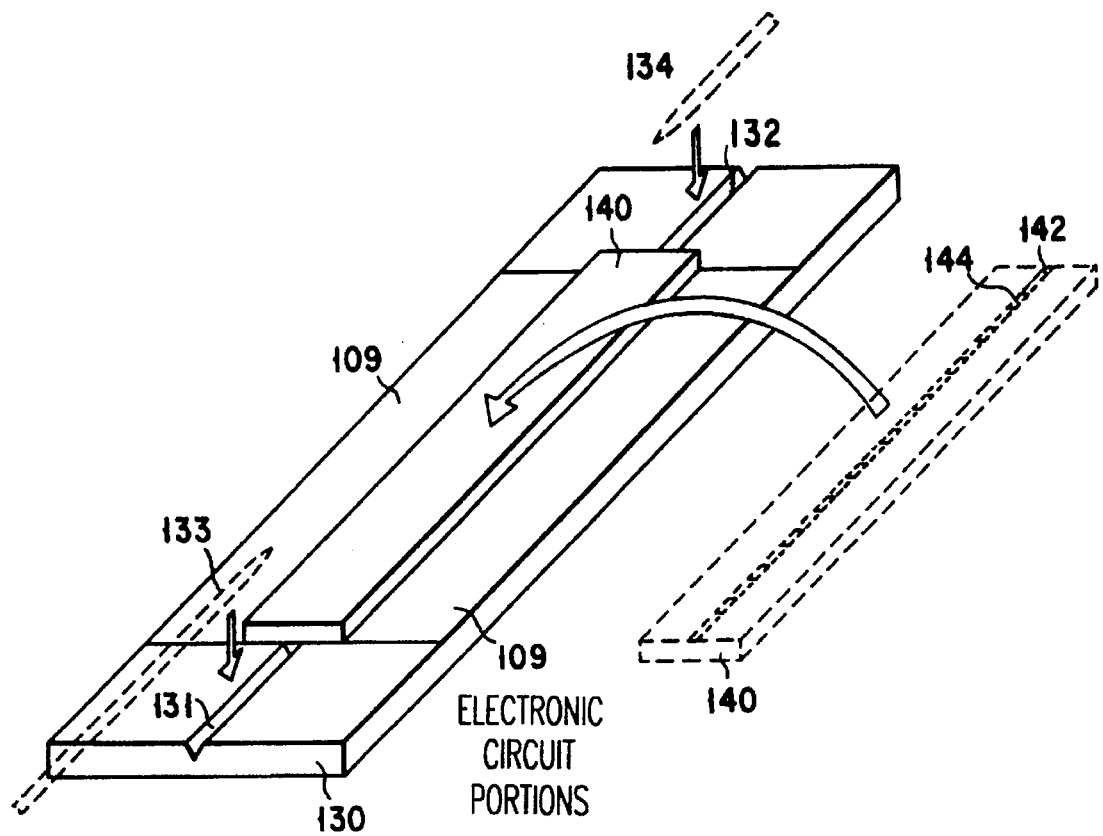
FIG. 20 is a perspective view schematically showing the arrangement of a modification of the light-receiving device of the fourth embodiment.
Figure 21:
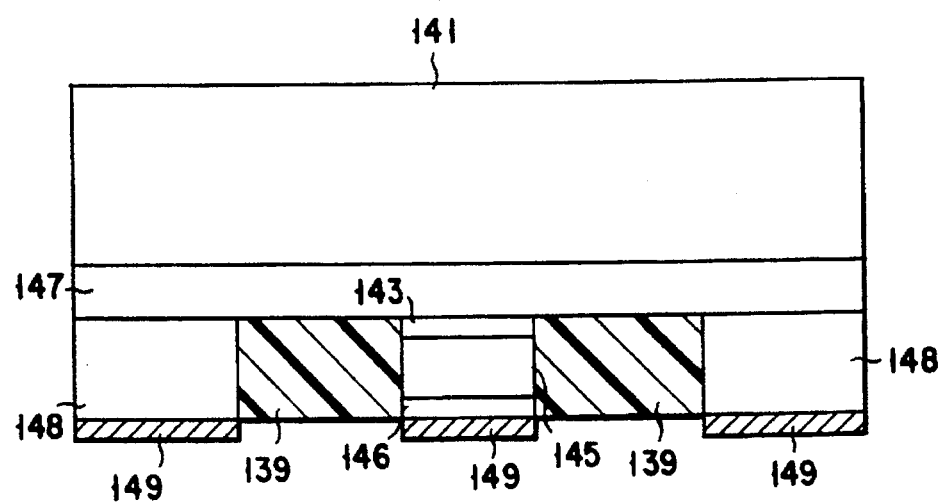
FIG. 21 is a sectional view schematically showing the sectional structure near the optical gate of the light-receiving device shown in FIG. 20.

FIG. 21 is a sectional view showing the sectional structure near the optical gate 144 of the light-receiving device as the modification of the fourth embodiment, which is shown in FIG. 20. In this modification, a substrate 141 consists of semi-insulating InP. An n-type InP cladding layer 147 is formed between the substrate 141 and an optical waveguide layer 143. A p-type InP cladding layer 145 and a p-type InGaAsP contact layer 146 are formed into a mesa on a quantum well optical waveguide layer 143. The optical waveguide layer 143 is constituted by a quantum well layer and a barrier relaxation layer, as in the fourth embodiment. N-type InP pad portions 148 are formed on both the sides of the mesa. Portions between the pad portions 148 and the mesa are flattened by polyimide layers 139. Electrodes 149 are formed on the mesa and the pad portions 148.

The basic operation of this modification is the same as in the fourth embodiment.

Regardless of the structure of this modification, the present invention can be variously modified and applied. The intersubband transition energy (trigger light wavelength) is not limited to 3.5 μm, and the well width is not limited to 5 nm, either. As the well width is increased, the trigger light wavelength tends to become longer. However, since the dipole moment is increased, the optical power necessary for obtaining a desired Stark shift can be decreased.

As described above, in the light-receiving device according to the fourth embodiment of the present invention, a signal light pulse string at a data rate of 100 Gb/s can be read as ten parallel electrical signals at a data rate of 10 Gb/s. As an optical demultiplexer, this light-receiving device achieves a simple, lightweight, compact, and stable arrangement, and a low dependency on polarization. In addition, since one trigger light pulse is shared for mode switching of a plurality of optical gates, the energy utilization efficiency is increased, and synchronization between channels is facilitated. With these effects, a practical optoelectronic demultiplexing function which is conventionally impossible can be realized at a low cost.

Fifth Embodiment

Figure 22:
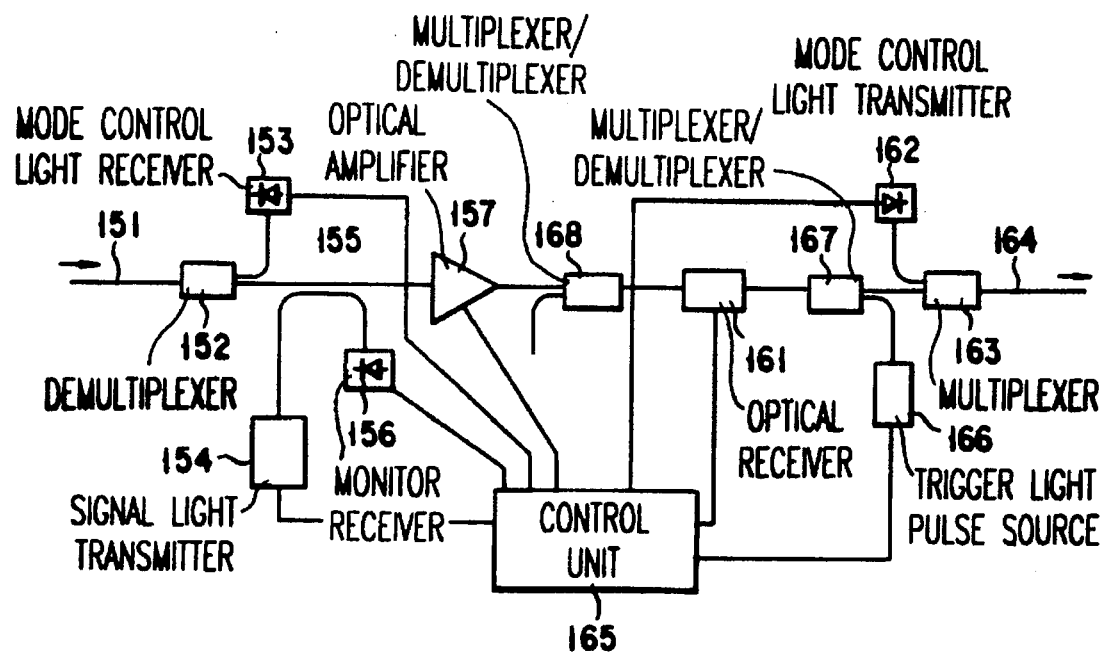
FIG. 22 is a view schematically showing the arrangement of a node of an optical transmission apparatus according to the fifth embodiment of the present invention.

FIG. 22 is a view schematically showing the arrangement of one node of an optical transmission apparatus according to the fifth embodiment of the present invention. This fifth embodiment is related to an add-drop type optical TDM transmission apparatus, as in the third embodiment.

This node is constituted by an input optical fiber 151, a demultiplexer 152, a node control light receiver 153, a signal light transmitter 154, an optical coupler 155, a monitor receiver 156, an optical amplifier 157, an optical receiver 161 capable of switching between transparent and light-receiving modes, a node control light transmitter 162, a multiplexer 163, an output optical fiber 164, a control unit 165, a trigger light pulse source 166, multiplexer/demultiplexers 167 and 168 for multiplexing/demultiplexing a trigger light pulse, and the like.

Node control light corresponds to the routing control signal in the above third embodiment and is used for transmission/reception operation control of each node, protocol control, monitor control, and the like. The wavelength of signal light is 1.55 μm. The wavelength of node control light is 1.3 μm. These light beams are wavelength-multiplexed by the multiplexer 163 or the demultiplexer 152 and propagate through the optical fibers 151 and 164. The data rate of the signal light is 40 Gb/s. The data rate of the node control light is 2.5 Gb/s.

Figure 23:
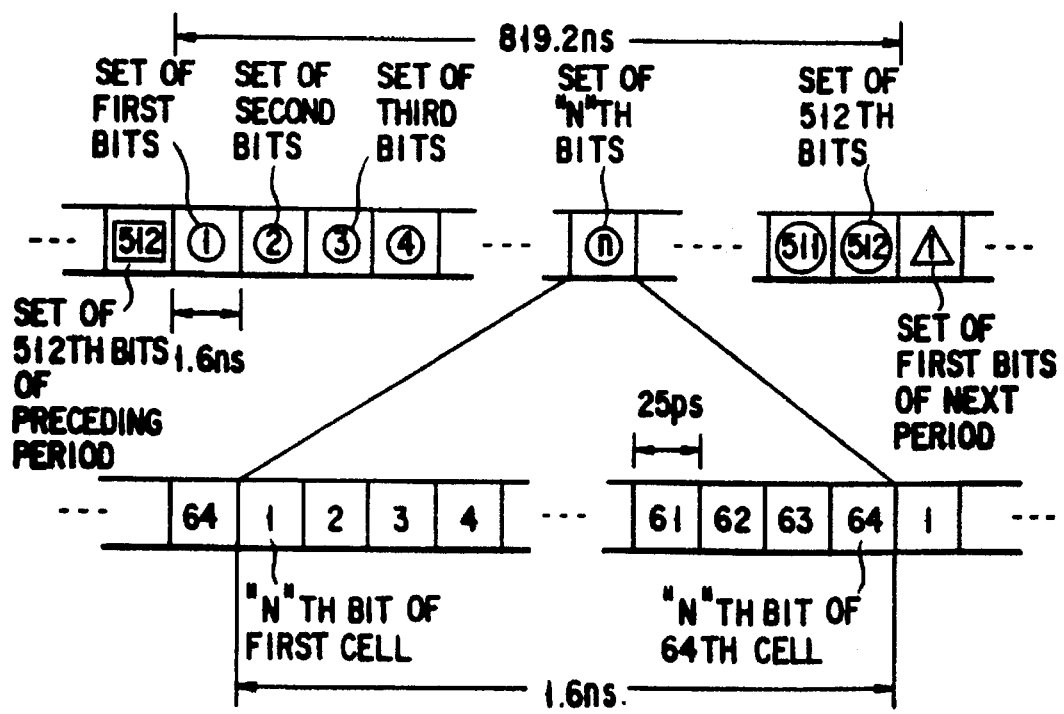
FIG. 23 is a view showing the structure of a signal light cell of the optical transmission apparatus shown in FIG. 22.

One cell of signal light is constituted by 512 bits at a period of 1.6 ns, as shown in FIG. 23. The time slot of 1 bit is 25 ps. Therefore, 64 cells can be multiplexed in the signal light by optical TDM at maximum. The signal light transmitter 154 is constituted by a semiconductor light source in which a pulse source and an optical modulator are integrated. The pulse source sends a light pulse string having a pulse width of 10 ps at a period of 1.6 ns to be synchronized with a cell determined as vacant in accordance with information obtained from the node control light. The optical modulator modulates this pulse light with an electrical signal at a data rate of 625 Mb/s. The signal light pulse obtained in this manner is multiplexed with another signal light pulse propagating through the optical fiber 154 by the optical coupler 155 by TDM, amplified by the optical amplifier 157, and supplied to the output optical fiber 164 through the optical receiver 161. In this manner, 1:64 optical multiplexing can be easily performed.

The optical receiver 161 has an arrangement applied when the light-receiving device described in the fourth embodiment has only one optical gate. The trigger light pulse source 166 sends strong pulse light having a length of 10 ps at a period of 1.6 ns in synchronism with the target reception cell designated by the node control light. The optical gate receives, of the propagating signal light pulses, only the light pulse synchronized with the trigger light pulse by the optical Stark effect described in the above fourth embodiment (light-receiving mode). As for the remaining light pulses, the optical gate is in the transparent mode. Therefore, the signal light pulses are relayed to the next node through the optical fiber 164 without being converted into an electrical signal.

As a result, a cell (512 bits) at a data rate of 625 Mb/s can be directly read as an electrical signal from the optical receiver 161. More specifically, 64:1 direct demultiplexing can be performed without converting other signals into electrical signals. The slot of a cell which becomes vacant upon reading can be used for optical transmission between other nodes again. In this manner, an optical TDM loop network with a high throughput can be realized.

When a plurality of (N) optical gates are arranged in place of the one optical gate in the fifth embodiment, multiplexing in units of bytes as in the third embodiment is also enabled. In this case, one cell is constituted by M bytes (e.g., 64 bytes), in which continuous N bit strings (e.g., 8 bits) corresponding to one byte are divided at a predetermined period (e.g., one byte every 1.6 ns). As shown in the fourth embodiment, the optical receiver performs the optoelectronic demultiplexing operation while N bit strings are defined as a processing unit, and parallel electrical signals corresponding to one byte are read by one trigger light pulse. As a matter of course, as in the third embodiment, a redundancy bit or a guard time may be added to the processing unit. The optical transmission apparatus of the present invention can be applied not only to an ATM network using a cell as a unit but also to an STM (synchronous transfer mode) fixed channel optical TDM network in which N fixed length bits are multiplexed by TDM. As described above, the optical transmission apparatus of the present invention is not limited to the above specific embodiment and can also be variously modified and applied.

Sixth Embodiment

Figure 24:
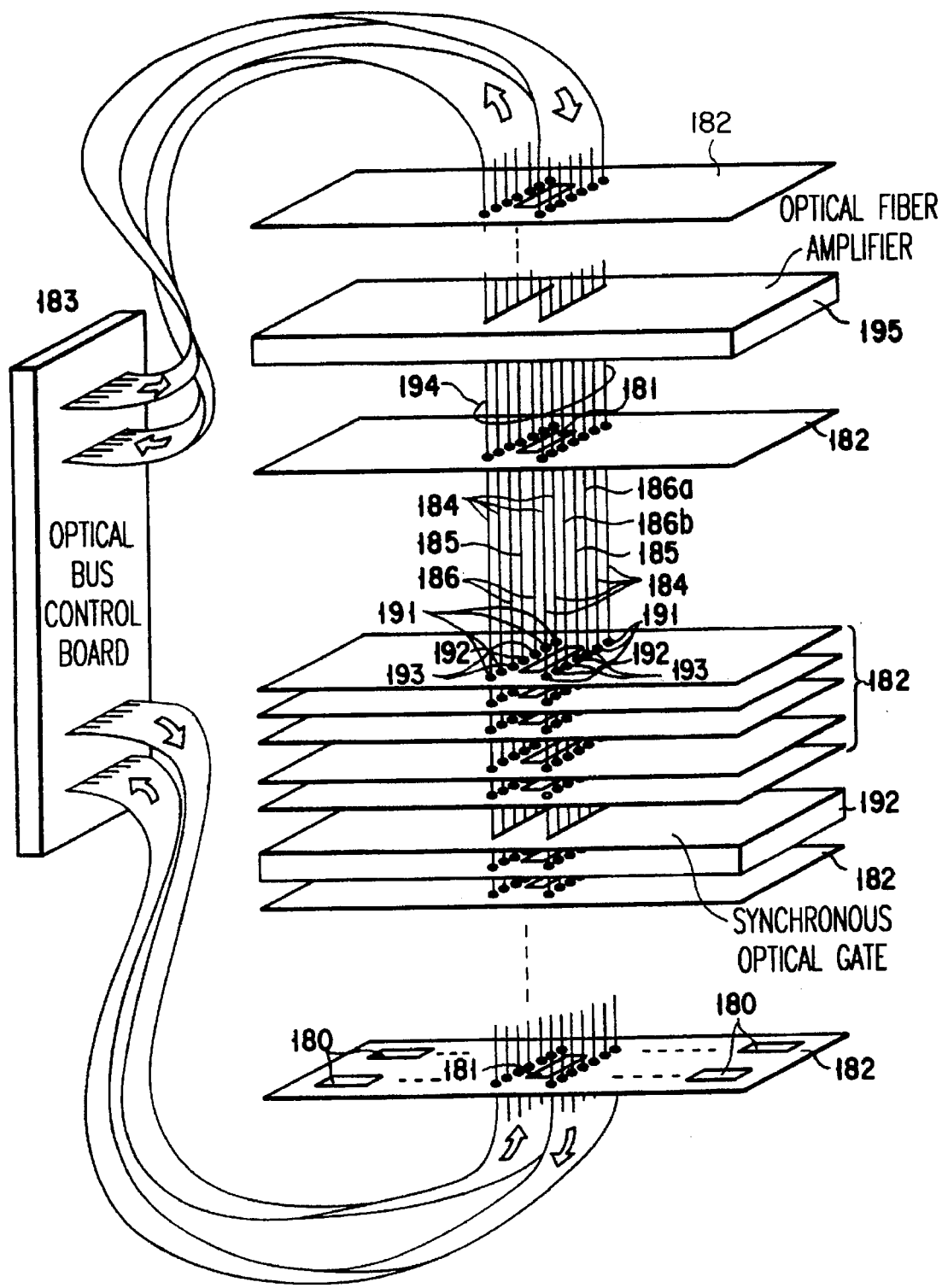
FIG. 24 is a view schematically showing the arrangement of an optical transmission apparatus according to the sixth embodiment of the present invention.

FIG. 24 is a view schematically showing the arrangement of an optical transmission apparatus according to the sixth embodiment of the present invention. The optical transmission apparatus according to the sixth embodiment is used as the optical bus of a parallel computer, or the like. The computer in the sixth embodiment is constituted by 80 boards 182 having a clock rate of 100 MHz, on which LSIs 180 such as processors and memories, and an optical interface unit 181 are mounted, and an optical bus control board 183. The boards 182 and 183 are connected in parallel by four optical buses 184 for a signal at 4 Gb/s. A synchronous optical bus 185 for distributing a synchronous signal to the boards 182, and up and down control optical buses 186 for performing transmission/reception control between the boards are arranged in parallel to the optical buses 184. Each optical bus has a two-way double loop structure. Since a total of eight buses 184 for a signal at 4 Gb/s are arranged, signal transmission at a rate of 32 Gb/s can be performed as a whole. Each board can simultaneously communicate with 4 to 8 boards at maximum.

Figure 25:
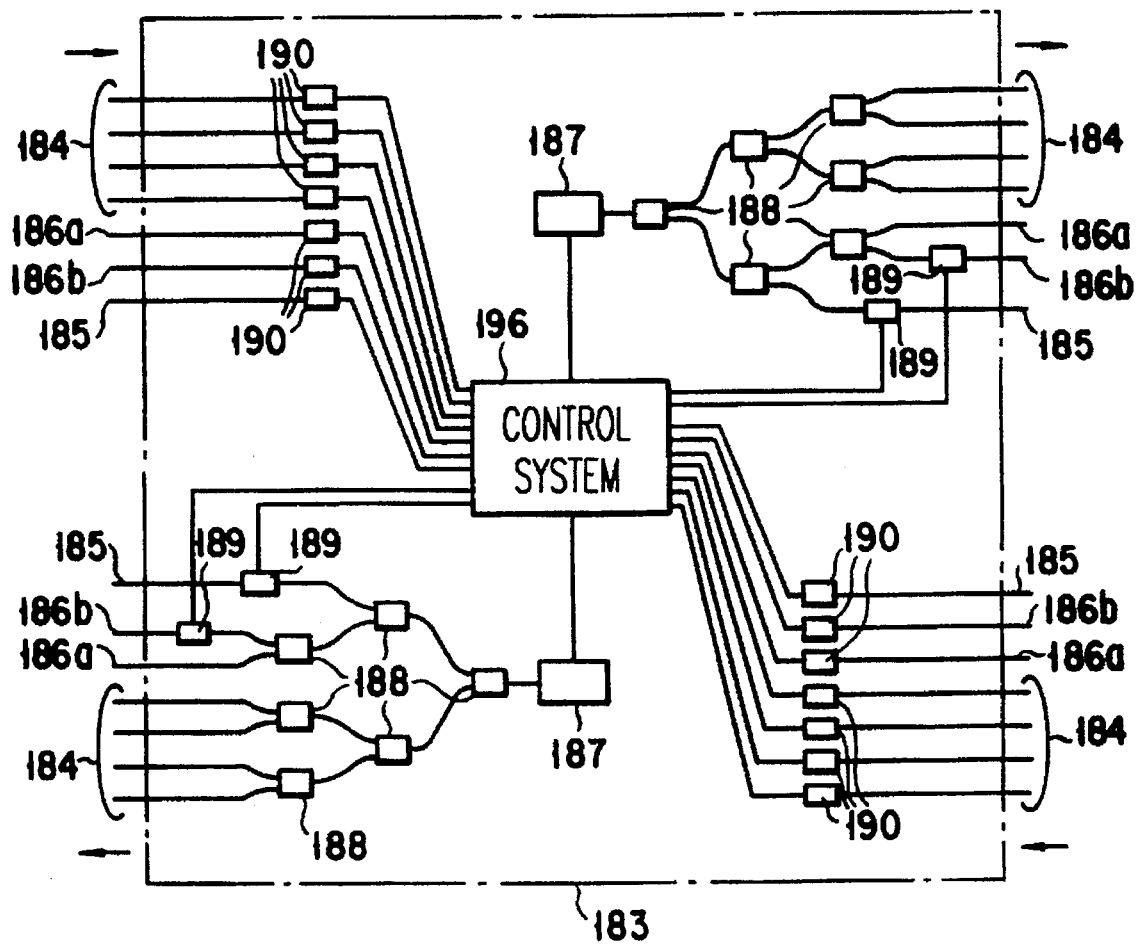
FIG. 25 is a view showing the arrangement of the optical bus control board of the optical transmission apparatus shown in FIG. 24.

FIG. 25 is a view showing the structure of the optical bus control board 183. The optical buses 184, 185, and 186 share gain switching semiconductor lasers 187 on the optical bus control board 183, each of which emits a pulse string having a width of 100 ps and a wavelength of 1.55 μm at a frequency of 4 GHz, as common light sources, and the pulse string is used as divided by optical couplers 188. When the single pulse source 187 is used, the timings of the respective optical buses are equalized.

For the synchronous optical bus 185 and the down control optical bus 186b, optical modulation elements 189 operated at a rate of 4 Gb/s are provided immediately after the optical couplers 188. A synchronous signal or a control signal is output by the optical modulation element 189. The optical buses 184, 185, and 186 connect signal optical gates 191, synchronous optical gates 192, control optical gates 193 arranged on the boards 182 through optical fibers 194 and are terminated at 4-Gb/s light-receiving devices 190 on the optical bus control board 183. Optical fiber amplifiers 195 are inserted in the optical buses 184, 185, and 186 at an appropriate interval, thereby compensating the coupling loss between the optical fibers 194 and the optical gates 191, 192, and 193, or the tapping loss of the synchronous optical gate 192. Antireflection films are formed on the incident/exit surfaces of the optical gates 191, 192, and 193, thereby preventing light from being reflected back.

The synchronous optical gate 192 is a planar type electroabsorption optical modulator operable at a rate of 4 Gb/s and always set in the partial light-receiving mode biased by a voltage for only partially absorbing a pulse. More specifically, part of the energy of a synchronous light pulse sent from the upstream side is received, and the remaining energy is transmitted to the downstream board. Since the optical gate is of a planar type, the dependency on polarization can be reduced by the circularly symmetrical structure.

The timing processing or electrical input/output for the optical gates 191 to 193 is controlled by the optical interface unit 181. The transmission/reception operation of the signal optical gate 191 and the control optical gate 193 of each board 182 is performed at a slot after a predetermined delay time with reference to the synchronous signal received by the synchronous optical gate 192.

When the synchronous light pulses are output at a period of 10 ns, this period includes only 40 slots each having a width of 250 ps (40 Gb/s). Since there are 80 boards 182, at least two periods (20 ns) are required to designate all slots. If the interval between the synchronous pulses becomes too large, an error in delay time may be caused. In the sixth embodiment, synchronous light pulses are sequentially transmitted in four different pulse patterns every 5 ns, thereby discriminating the 80 slots from each other.

The control optical gate 193 is an optical modulator having the same structure as that of the synchronous optical gate 192. In the upward control optical bus 186a, it can be switched between the transparent mode and the transmission (modulation) mode. In the download control optical bus 186b, it can be switched between the transparent mode and the reception (light-receiving) mode. More specifically, a slot after a fixed delay time which is defined for each board in accordance with the synchronous signal is assigned to the transmission or reception mode in correspondence with the upward or downward use. The remaining slots are set in the transparent mode wherein no voltage is applied, and all light pulses sent from the upstream side are transmitted to the downstream side.

When a signal transmission request is to be issued, the control optical gate 193 modulates a light pulse by using the electroabsorption effect, which pulse is sent from the upstream to the slot without being modulated, thereby transmitting a control signal onto the optical bus control board 183. As a result, in each board, multiplexing is performed to set a control signal at only one of the 80 slots.

The control signal at a data rate of 4 Gb/s received by the light-receiving device 190 on the optical bus control board 183 is sent to a control system 196. The control system 196 assigns a signal bus and a slot to each transmission/reception board 182, and transmits the control signal to the slot assigned to each board by using the downward control optical bus 186b.

The control optical gate 193 in the reception mode is in a voltage-applied state and receives the control signal transmitted from the modulation element 189 of the optical bus control board 183. As a result, a demultiplexing operation is performed to extract one slot at an output rate of 50 Mb/s from the 80 slots at 4 Gb/s. The optical interface unit 181 controls the input/output operation of the signal optical gate 191 in accordance with the control signal.

The operation principle of the control optical gate 193 is the same as in the first to third embodiments except that the optical gate is of a planar type. In this sixth embodiment, however, the optical gates 191 and 193 are not immediately switched to the light-receiving mode by a trigger light pulse, unlike the above embodiments, and switched to the light-receiving mode after a predetermined delay time from the synchronous light pulse. In addition, the synchronous light signal corresponding to the trigger light pulse of the above embodiments has four patterns constituted by a plurality of slots. Furthermore, the synchronous light and the signal light propagate in the same direction, and the optical path between the optical gates is not limited. Since the operation rate is low, the optical gates 191 and 193 can complete the reception or modulation operation within one slot (250 ps).

The signal optical gate 191 also has the same structure as in the control optical gate 193 and can perform a switching operation of three modes, i.e., transparent, reception (light-receiving), and transmission (modulation) modes. More specifically, only a slot designated by the optical bus control board 183 is set in the transmission or reception mode, and the remaining slots are set in the transparent mode. The basic operation is the same as that of the control optical gate 193. However, the signal optical gate 191 performs the transmission/reception operation at 100 MHz. Therefore, 40:1 multiplexing/demultiplexing is performed. In the control optical bus 186, fixed electrical multiplexing/demultiplexing is performed at one of the input and output terminals (optical bus control board 183). However, in the signal optical bus 184, optical multiplexing/demultiplexing is performed through the optical gate 191 at both the input and output terminals. Unlike the control optical bus 186, the designated slot of the signal optical bus 184, i.e., the delay time from the synchronous signal is variable and designated by the optical bus control board 183 through the down control optical bus 186b. For this reason, all the slots can be efficiently used.

The sixth embodiment can also be variously modified. In the above sixth embodiment, the two upward and downward control optical buses 186 are provided. However, a single control optical bus can also be time-divisionally used. In this case, by increasing the types of the synchronous light pulses, time designation for 160 slots can be performed in both transmission and reception. As in the signal optical gate, the control optical gate is used while switching three modes, i.e., transparent, reception (light-receiving), and transmission (modulation) modes. As another modification, the synchronous optical bus may also be commonly time-divisionally used as the control optical bus. Signals can also be time-divisionally used by the same optical bus as for the control signal and the synchronous signal. Inversely, the present invention can also be applied to a larger-scaled system by block formation.

The optical gate of the sixth embodiment can be used while switching the three functions such as reception, transmission, and transparent modes and allows very flexible utilization. Since the signal light, the control light, and the synchronous light use the same pulse source, stable synchronization can be realized, and rearrangement of the boards is also allowed. Since no active optical device is mounted on the general boards 182, the reliability is also increased.

The number of optical gates, the transmission rate, the trigger repetition frequency of the light-receiving device or transmission apparatus of the present invention are not limited to the specific values in the above first to sixth embodiments. For example, the materials are not limited to InGaAsP-based materials or materials in a wavelength band of 1.55 µm. The present invention can also be applied to various semiconductor materials such as GaAlAs-, InGaAlAs-, InGaSbAs-, InGaAlP-, ZnCdMgSSeTe-, and InGaAlN-based materials. Depending on selection of materials and structure design, the present invention can be applied to signal light or trigger light having various wavelengths. As for the optical waveguide, the present invention can be applied to various semiconductor optical waveguides, glass-based optical waveguides, ferroelectic optical waveguides, optical fibers, lenses, and the like. The function can be improved by integration with other elements. For example, a semiconductor laser amplifier for compensating a propagation loss may be integrated between the optical gates. Alternatively, a semiconductor pulse source, an optical switch, a wavelength filter, or the like may be integrated. As for the application fields, the present invention is not limited to optical communications, and can also be used in various fields such as optical switching, optical interconnection, optical information processing, optical measurement, and the like. For example, when the present invention is applied to very-high-speed optical measurement, measurement with a time resolving power shorter than the electrical response time of an optical gate or read circuit can be realized. In this case, an analog output may be obtained in place of the binary digital output as in the above embodiments. Additionally, various changes and modifications can be made without departing from the scope or spirit of the present invention.

As has been described above in detail, according to the present invention, optical demultiplexing more efficient than that by the conventional optical demultiplexer by optical TDM can be realized while achieving a compact, lightweight, and stable arrangement and a low dependency on polarization.

What is claimed is:

1. A light-receiving device comprising:

optical waveguide means for propagating a time-series signal light pulse string;

a plurality of optical gates, arranged in series along said optical waveguide means, and capable of switching a transparent mode and a light-receiving mode in accordance with the presence/absence of a trigger light pulse;

mode switching means for switching each of said plurality of optical gates from the transparent mode to the light-receiving mode by sending the trigger light pulse to each of said plurality of optical gates such that each of said plurality of optical gates can receive a predetermined slot included in the signal light pulse string; and means for reading the slots received by said plurality of optical gates as parallel electrical signals with a bit rate lower than that of the signal light pulse string.

2. A device according to claim 1, wherein mode switching of each of said plurality of optical gates is performed when a band edge wavelength is changed by a Stark effect caused by an applied field.

3. A device according to claim 2, wherein said mode switching means includes a plurality of photoconductive switches each of which is electrically connected to a corresponding one of said plurality of optical gates, and each of said photoconductive switches changes a voltage to be applied to said optical gate upon switching from a high-resistance state to a low-resistance state in accordance with the trigger light pulse to cause a Stark shift in said optical gate.

4. A device according to claim 3, further comprising second optical waveguide means arranged parallel to said optical waveguide means, in which said plurality of photoconductive switches are inserted at a predetermined interval, wherein the trigger light pulse propagates through said second optical waveguide means in a direction opposite to a propagation direction of the signal light pulse string in synchronism with the signal light pulse string.

5. A device according to claim 1, wherein mode switching of each of said plurality of optical gates is performed when a band edge wavelength is changed by an optical Stark effect caused by the trigger light pulse.

6. A device according to claim 5, wherein each of said optical gates has a quantum well structure, and the trigger light pulse has a wavelength corresponding to an intersubband transition energy of said quantum well.

7. A device according to claim 6, wherein said optical gates have bias voltage application means which applies a bias voltage to said quantum well such that the transparent mode is changed to the light-receiving mode when the optical Stark effect is caused by the trigger light pulse.

8. A device according to claim 5, wherein the trigger light pulse sent by said mode switching means sequentially switches each of said optical gates from the transparent mode to the light-receiving mode while propagating through said optical waveguide means in a direction opposite to a propagation direction of the signal light pulse.

9. A device according to claim 1, wherein said plurality of optical gates and said optical waveguide means are integrated on a single substrate.

10. A device according to claim 1, wherein said plurality of optical gates are formed on a plurality of substrates arranged at a predetermined optical path interval, and the signal light pulse string propagates to cross said plurality of substrates.

11. An optical transmission apparatus in which a plurality of nodes are connected to each other through an optical fiber, each of said plurality of nodes comprising:

means for transmitting a series of time-series light pulse signal groups onto said optical fiber while selecting a timing not to overlap another light signal pulse group transmitted through said optical fiber;

reception means for selecting and receiving only a light pulse signal group to be received by said node from the series of light pulse signal groups transmitted through said optical fiber; and relay means for relaying a light pulse signal group which is to be received by another node to a next node without converting the light pulse signal group into an electrical signal;

wherein said reception means, includes, a plurality of semiconductor electroabsorption optical gates inserted in series along an optical waveguide at a predetermined interval and capable of switching between a transparent mode and a light-receiving mode in accordance with an applied voltage, a plurality of optical semiconductor trigger switches for changing a voltage to be applied to said plurality of optical gates to sequentially switch said plurality of optical gates from the transparent mode to the light-receiving mode, and means for reading the light pulse signal group absorbed by said plurality of optical gates as parallel electrical signals.

12. An optical transmission apparatus in which a plurality of nodes are connected to each other through an optical fiber, each of said plurality of nodes comprising:

means for transmitting a series of time-series light pulse signal groups onto said optical fiber while selecting a timing not to overlap another light signal pulse group transmitted through said optical fiber; and reception/relay means for selecting and receiving only a light pulse signal group to be received by said node from the series of light pulse signal groups transmitted through said optical fiber and relaying a light pulse signal group which is to be received by another node to a next node without converting said light pulse signal group into an electrical signal;

wherein said reception/relay means, includes, a plurality of optical Stark gates inserted in series along an optical waveguide at a predetermined interval and capable of switching between a transparent mode and a light-receiving mode in accordance with the presence/absence of a trigger light pulse, and means for reading the light pulse signal groups absorbed by said plurality of optical Stark gates as parallel electrical signals.

13. An optoelectronic demultiplexing method comprising the steps of:

inserting a plurality of optical gates capable of switching between a transparent mode and a light-receiving mode in accordance with the presence/absence of a trigger light pulse in predetermined positions of an optical waveguide for propagating a time-series signal light pulse string;

switching each of said plurality of optical gates from the transparent mode to the light-receiving mode by sending the trigger light pulse to each of said plurality of optical gates such that each of said plurality of optical gates can receive a predetermined slot included in the signal light pulse string; and reading the slots received by said plurality of optical gates as parallel electrical signals with a bit rate lower than that of the signal light pulse string.

14. An optoelectronic demultiplexing method comprising the steps of:

inserting a plurality of optical gates capable of switching between a transparent mode and a light-receiving mode in accordance with the presence/absence of a Stark shift in predetermined positions of an optical waveguide for propagating a time-series signal light pulse string;

electrically connecting each of a plurality of photoconductive switches to a corresponding one of said plurality of optical gates, each of said photoconductive switches changing a voltage to be applied to the corresponding optical gate upon switching from a high-resistance state to a low-resistance state in accordance with a trigger light pulse to cause the Stark shift in said optical gate;

switching each of said plurality of optical gates from the transparent mode to the light-receiving mode by sending the trigger light pulse to each of said plurality of photoconductive switches such that each of said plurality of optical gates can receive a predetermined slot included in the signal light pulse string; and reading the slots received by said plurality of optical gates as parallel electrical signals with a bit rate lower than that of the signal light pulse string.

* * * * *

UNITED STATES PATENT AND TRADEMARK OFFICE
CERTIFICATE OF CORRECTION

PATENT NO. : 5,654,812
DATED : August 5, 1997
INVENTOR(S) : Nobuo SUZUKI

It is certified that error appears in the above-identified patent and that said Letters Patent is hereby corrected as shown below:

On the title page, item [54], and the top of column 1, the title should be:

--OPTOELECTRONIC-- instead of OPTICAL

Signed and Sealed this

Sixteenth Day of December, 1997

Attest:

BRUCE LEHMAN

Attesting Officer

Commissioner of Patents and Trademarks